United States Patent
Kume et al.

(10) Patent No.: US 9,252,698 B2
(45) Date of Patent: Feb. 2, 2016

(54) INVERTER DEVICE AND MOTOR DRIVE SYSTEM

(71) Applicant: KABUSHIKI KAISHA YASKAWA DENKI, Kitakyushu (JP)

(72) Inventors: Tsuneo Kume, Kitakyushu (JP); Hidenori Hara, Kitakyushu (JP); Koji Higashikawa, Kitakyushi (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 132 days.

(21) Appl. No.: 14/162,740

(22) Filed: Jan. 24, 2014

(65) Prior Publication Data

US 2014/0217946 A1    Aug. 7, 2014

(30) Foreign Application Priority Data

Feb. 1, 2013 (JP) .................. 2013-018808

(51) Int. Cl.
- H02P 1/00 (2006.01)
- H02P 3/00 (2006.01)
- H02P 7/06 (2006.01)
- H02P 25/18 (2006.01)
- H02P 6/08 (2006.01)

(52) U.S. Cl.
CPC ............. H02P 25/188 (2013.01); H02P 6/08 (2013.01)

(58) Field of Classification Search
CPC ......... H02P 25/20; H02P 25/18; H02P 23/06; H02P 25/188; H02P 1/42; H02P 1/44; H02P 21/0035; H02P 21/04; H02P 27/026; H02P 27/06; H02P 29/0016; H02P 3/20; H02P 6/08; H02P 6/20; H01L 2924/0002

USPC ................ 318/497, 504, 808, 400.21, 400.26
See application file for complete search history.

(56) References Cited

U.S. PATENT DOCUMENTS

| | | | | |
|---|---|---|---|---|
| 4,453,118 A | * | 6/1984 | Phillips et al. | 318/779 |
| 4,712,054 A | * | 12/1987 | Boldt | 318/758 |
| 5,216,343 A | * | 6/1993 | Genheimer et al. | 318/568.18 |
| 5,256,951 A | * | 10/1993 | Nashiki et al. | 318/575 |

(Continued)

FOREIGN PATENT DOCUMENTS

| | | |
|---|---|---|
| CN | 102868347 | 1/2013 |
| JP | 06-225588 | 8/1994 |

(Continued)

OTHER PUBLICATIONS

Japanese Office Action for corresponding JP Application No. 2013-018808, Mar. 18, 2014.

(Continued)

*Primary Examiner* — Paul Ip
(74) *Attorney, Agent, or Firm* — Mori & Ward, LLP

(57) ABSTRACT

An inverter device includes a power supply unit and a switch controller. The power supply unit supplies AC power to an AC motor whose electric characteristics in response to a rotation speed are switchable between low speed characteristics and high speed characteristics. The switch controller switches the electric characteristics of the AC motor. The switch controller executes switching control that alternately switches the electric characteristics of the AC motor between the low speed characteristics and the high speed characteristics on the basis of the rotation speed of the AC motor.

21 Claims, 15 Drawing Sheets

(56) References Cited

U.S. PATENT DOCUMENTS

| | | | |
|---|---|---|---|
| 5,821,722 A * | 10/1998 | Forbes et al. | 318/696 |
| 5,883,488 A * | 3/1999 | Woodward | 318/786 |
| 6,847,185 B2 * | 1/2005 | Kume et al. | 318/732 |
| 7,084,600 B2 * | 8/2006 | Suzuki et al. | 318/802 |
| 8,183,817 B2 * | 5/2012 | Higashikawa et al. | 318/807 |
| 8,207,701 B2 * | 6/2012 | Tang et al. | 318/808 |
| 8,269,450 B2 * | 9/2012 | Higashikawa et al. | 318/771 |
| 2004/0195994 A1 * | 10/2004 | Kume et al. | 318/807 |
| 2010/0237815 A1 * | 9/2010 | Higashikawa et al. | 318/400.21 |
| 2011/0080131 A1 | 4/2011 | Shimada et al. | |
| 2012/0025779 A1 * | 2/2012 | Xu et al. | 320/129 |
| 2012/0206083 A1 * | 8/2012 | Higashikawa et al. | 318/808 |
| 2013/0009586 A1 * | 1/2013 | Chen et al. | 318/504 |
| 2013/0221791 A1 * | 8/2013 | Tomohara et al. | 310/198 |

FOREIGN PATENT DOCUMENTS

| | | |
|---|---|---|
| JP | 2010-022165 | 1/2010 |
| JP | 2011-083069 | 4/2011 |
| JP | 2012-222848 | 11/2012 |

OTHER PUBLICATIONS

Osama et al. "A New Inverter Control Scheme for Induction Motor Drives Requiring Wide Speed Range", IEEE Transactions on Industry Applications, Jul./Aug. 1996, p. 938-944, vol. 32. No. 4.

Chinese Office Action for corresponding CN Application No. 201310737925.X, Nov. 16, 2015.

* cited by examiner

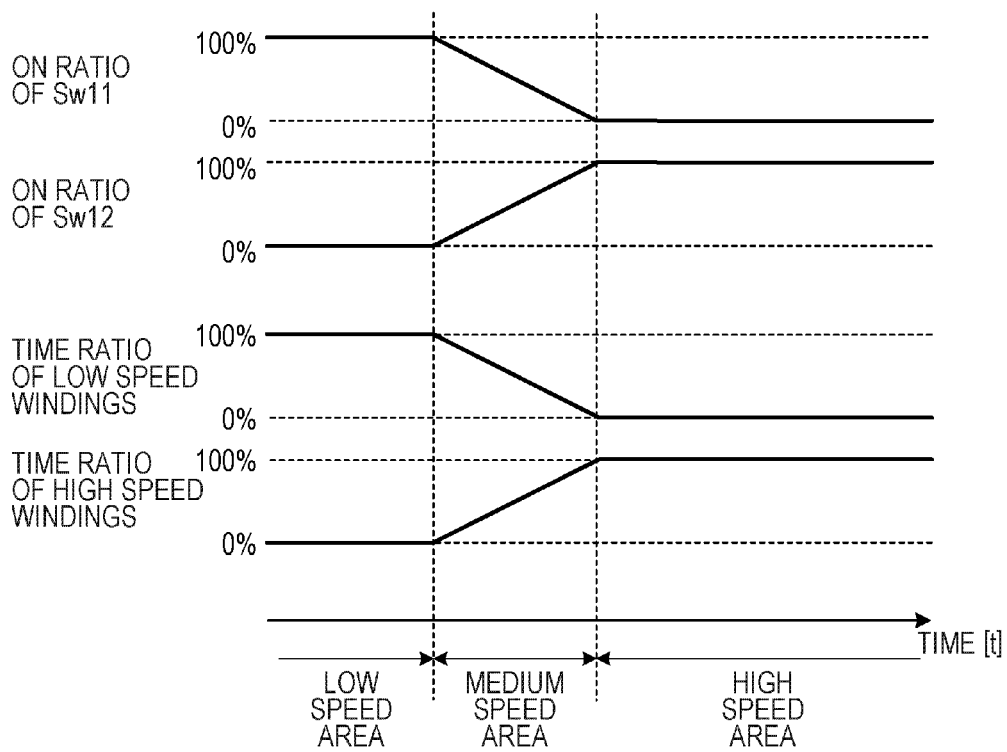
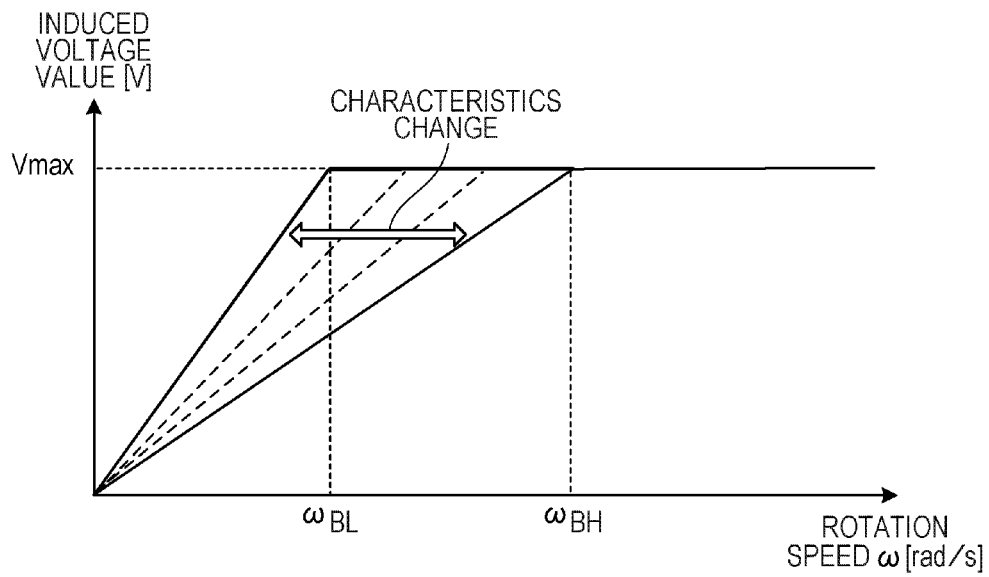

INVERTER DEVICE AND MOTOR DRIVE SYSTEM

CROSS-REFERENCE TO RELATED APPLICATIONS

The present disclosure contains subject matter related to that disclosed in Japanese Priority Patent Application JP 2013-018808 filed in the Japan Patent Office on Feb. 1, 2013, the entire contents of which are hereby incorporated by reference.

BACKGROUND

1. Field of the Invention

The embodiments disclosed herein relate to an inverter device and a motor drive system.

2. Description of the Related Art

There has been available a winding switching method enabling a wide-area operation from a low speed area to a high speed area by switching the armature windings of an alternating-current (AC) motor to switch the electric characteristics of the AC motor.

In this winding switching method, to reduce a shock caused by switching of the windings, measures are taken, such as prohibiting switching of the windings in a circumstance where the number of rotations of the AC motor is rapidly changing (see Japanese Unexamined Patent Application Publication No. 06-225588).

However, when such measures are taken, the efficiency is low in the case where the speed is consecutively increasing from low speed to high speed, for example, and a sufficient torque is not obtained. To this end, the present applicant has proposed in Japanese Unexamined Patent Application Publication No. 2010-22165 an inverter device capable of reducing a shock caused by switching of the windings even during acceleration or deceleration.

The inverter device described in Japanese Unexamined Patent Application Publication No. 2010-22165 calculates a d-axis current command correction value, which is a correction value of a d-axis current command, when a voltage command exceeds a maximum voltage value that can be output to an AC motor, and performs field weakening control that corrects the d-axis current command by using the calculated d-axis current command correction value. In this field weakening control, the inverter device described in Japanese Unexamined Patent-Application Publication No. 2010-22165 preliminarily calculates a d-axis current command correction value prior to switching of the windings, and, at a winding switching timing, corrects the d-axis current command by using the pre-calculated d-axis current command correction value.

Accordingly, a delay in calculating a d-axis current command correction value, which is one of the causes of a shock caused by switching of the windings, can be removed, and smooth winding switching becomes possible even during acceleration or deceleration.

However, because the inverter device described in Japanese Unexamined Patent Application Publication No. 2010-22165 preliminarily calculates a d-axis current command correction value prior to switching of the windings and corrects a d-axis current value by using the d-axis current command correction value at a winding switching timing, the processing is complicated.

SUMMARY

According to an aspect of the disclosure, there is provided an inverter device including a power supply unit and a switch controller. The power supply unit supplies alternating-current (AC) power to an AC motor whose electric characteristics in response to a rotation speed are switchable between low speed characteristics and high speed characteristics. The switch controller switches the electric characteristics of the AC motor. The switch controller executes switching control that alternately switches the electric characteristics of the AC motor between the low speed characteristics and the high speed characteristics on the basis of the rotation speed of the AC motor.

BRIEF DESCRIPTION OF THE DRAWINGS

FIG. 11 is a diagram illustrating the relationship among the ON ratio of switching elements and the time ratio of the low speed windings and the high speed windings in the case where the AC motor is accelerated;

FIG. 12 is a diagram illustrating the relationship between the rotation speed and induced voltage value of the AC motor in the motor drive system;

DESCRIPTION OF THE EMBODIMENTS

Hereinafter, embodiments of an inverter device and a motor drive system (hereinafter simply referred to as a "drive system") according to the present disclosure will be described in detail with reference to the accompanying drawings. As an example in which the electric characteristics of an AC motor in response to the rotation speed are switched, an example in which the winding state of the AC motor is switched will be described in first to fifth embodiments, and an example in which the number of poles of the AC motor is switched will be described in a sixth embodiment. However, the present disclosure is not limited by these embodiments.

First Embodiment

Figure 1:
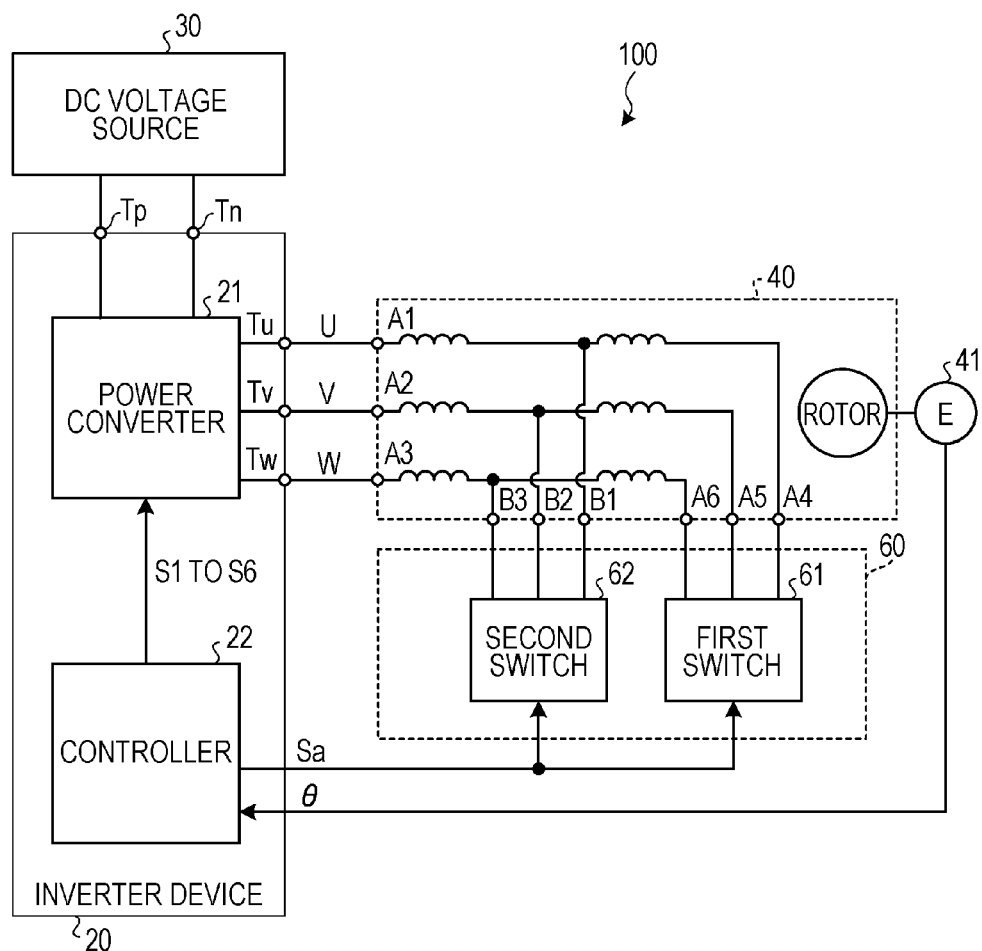
FIG. 1 is a diagram illustrating a motor drive system according to a first embodiment.

Firstly, a drive system according to the first embodiment will be described. FIG. 1 is a diagram illustrating the drive system according to the first embodiment.

As illustrated in FIG. 1, a drive system 100 according to the first embodiment includes an AC motor 40, an inverter device 20, a direct-current (DC) voltage source 30, a position detector 41, and a winding switch 60.

The inverter device 20 is a power inverter including a power converter 21 (an example of a power supply unit) and a controller 22. The power converter 21 is controlled by the controller 22. The inverter device 20 includes input terminals Tp and Tn and output terminals Tu, Tv, and Tw. The inverter device 20 converts DC power, supplied from the DC voltage source 30 via the input terminals Tp and Tn, into three-phase AC power by using the power converter 21, and outputs the three-phase AC power from the output terminals Tu, Tv, and Tw.

The DC voltage source 30 includes an AC power source and a rectifier circuit and supplies DC power to the inverter device 20. The DC voltage source 30 may be a DC power source without having a rectifier circuit, such as a battery.

The AC motor 40 is a three-phase AC motor including a set of three-phase armature windings of U-phase, V-phase, and W-phase and is driven by a voltage (hereinafter referred to as an output terminal voltage) output from the output terminals Tu, Tv, and Tw of the inverter device 20. The AC motor 40 is provided with, for the individual phases, connection terminals A1 to A6 for extracting two ends of the armature windings and connection terminals B1 to B3 for extracting the midpoints of the armature windings.

The connection terminals A1 to A3 are provided at one ends of the armature windings of the individual phases and are connected respectively to the output terminals Tu, Tv, and Tw of the inverter device 20. In addition, the winding switch 60 is connected to the connection terminals A4 to A6, provided at termination ends of the armature windings of the individual phases, and the connection terminals B1 to B3, provided at the midpoints of the armature windings of the individual phases.

The position detector 41 is connected to an output shaft of the AC motor 40 and detects the phase θ of a rotor of the AC motor 40 (hereinafter referred to as a rotor phase θ). The position detector 41 is, for example, an encoder or a resolver.

The winding switch 60 switches the connection of the armature windings of the individual phases. The winding switch 60 includes a first switch 61 connected to the connection terminals A4 to A6 of the AC motor 40 and a second switch 62 connected to the connection terminals B1 to B3 of the AC motor 40. The winding switch 60 is controlled by the controller 22 of the inverter device 20. The winding switch 60 and the controller 22 are an example of a switch controller.

The controller 22 causes the first switch 61 to operate, thereby short-circuiting the termination ends of the armature windings of the AC motor 40 and switching the winding state of the AC motor 40. Accordingly, the impedance of the AC motor 40 is maximized. This winding state is called the low speed windings (exemplary low speed characteristics). The higher the rotation speed becomes, the greater the induced voltage of the AC motor 40 becomes and the easier the output terminal voltage becomes saturated. Thus, field weakening control is started at a relatively low speed. The output terminal voltage is a voltage including the induced voltage of the AC motor 40 and a voltage drop caused by the primary impedance of the AC motor 40.

Meanwhile, the controller 22 causes the second switch 62 to operate, thereby short-circuiting the midpoints of the armature windings of the AC motor 40 and switching the winding state of the AC motor 40. Accordingly, the impedance of the AC motor 40 decreases. This winding state is called the high speed windings (exemplary high speed characteristics). When the winding state of the AC motor 40 is the high speed windings, the induced voltage decreases by decreasing the impedance.

The controller 22 causes the first switch 61 to operate in a low speed operation and causes the second switch 62 to operate in a high speed operation, thereby switching the winding state.

Further, between a low speed operation based on the low speed windings and a high speed operation based on the high speed windings, the controller 22 executes switching control that alternately switches the winding state of the AC motor 40 between the low speed windings and the high speed windings.

Figure 2:
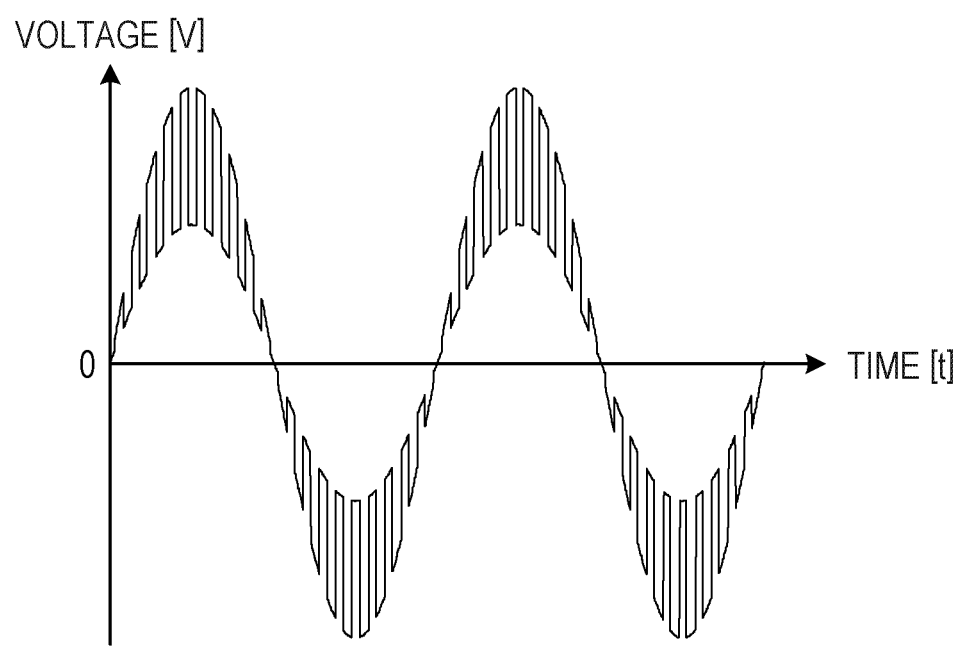
FIG. 2 is a diagram illustrating an example of the waveform of a voltage output from an inverter device to an AC motor in a medium speed operation.

FIG. 2 is a diagram illustrating an example of the waveform of a voltage output from the inverter device 20 to the AC motor 40 in an operation based on the low speed windings and the high speed windings (hereinafter referred to as a medium speed operation). As illustrated in FIG. 2, switching control is executed at a frequency higher than the output frequency of the inverter device 20 in a medium speed operation.

In switching control, the controller 22 adjusts the ratio between a time in which the winding state is switched to the low speed windings and a time in which the winding state is switched to the high speed windings in accordance with the speed of the AC motor 40. Accordingly, a medium voltage between a voltage in the case of the low speed windings and a voltage in the case of the high speed windings can be obtained. Therefore, compared with the case, as has been done previously, in which the operation is switched between a low speed operation based on the low speed windings and a high speed operation based on the high speed windings, even during acceleration or deceleration, sudden fluctuations of winding characteristics can be suppressed, and effects caused by switching of the windings can be suppressed.

Accordingly, an increase in the induced voltage can be suppressed without relying on field weakening control. A speed area where the efficiency is high can be enlarged.

Hereinafter, specific configurations of the inverter device 20 and the winding switch 60 according to the first embodiment will be described. Firstly, the specific configuration of the winding switch 60 will be described, and then the specific configuration of the inverter device 20 will be described.

Exemplary Configuration of Winding Switch 60

Figure 3:
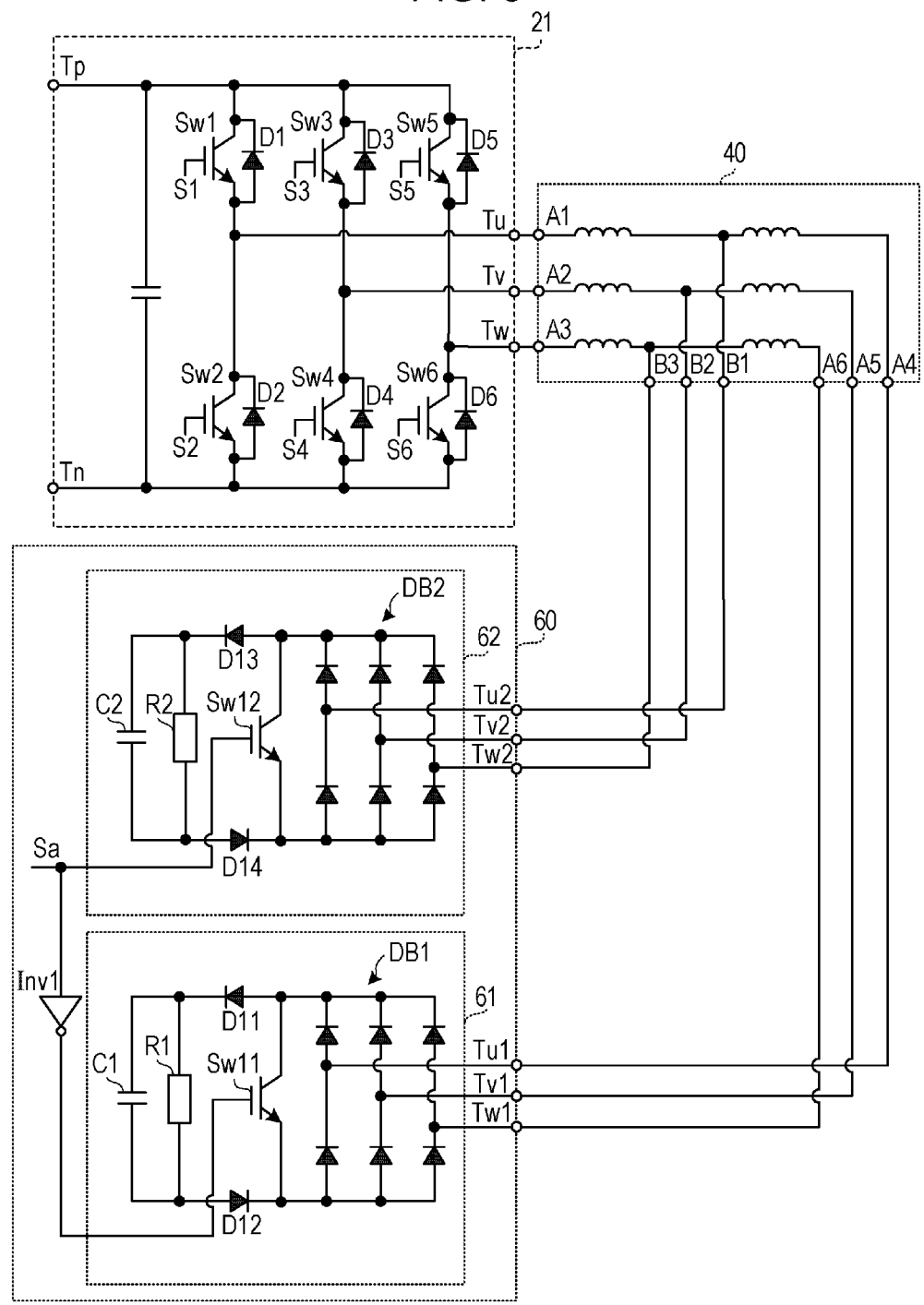
FIG. 3 is a circuit diagram illustrating the configuration of a power converter and a winding switch unit illustrated in FIG. 1.

FIG. 3 is a circuit diagram illustrating the configuration of the power converter 21 and the winding switch 60. As has been described earlier, the winding switch 60 includes the first switch 61 connected to the connection terminals A4 to A6 of the AC motor 40, the second switch 62 connected to the connection terminals B1 to B3 of the AC motor 40, and a logical NOT circuit Inv1. The winding switch 60 switches the winding characteristics of the AC motor 40 by short-circuiting the termination ends or the midpoints of the armature windings of the AC motor 40 by using the first switch 61 and the second switch 62.

As illustrated in FIG. 3, the first switch 61 includes a three-phase diode bridge DB1, a switching element Sw11, a resistor element R1, a capacitor element C1, and diodes D11 and D12. AC input terminals Tu1, Tv1, and Tw1 of the three-phase diode bridge DB1 are respectively connected to the connection terminals A4 to A6 of the AC motor 40.

The switching element Sw11 is connected to a DC output side of the three-phase diode bridge DB1 and connects or opens the DC outputs of the three-phase diode bridge DB1. The switching element Sw11 is a self-arc-extinguishing semiconductor switch such as a bipolar transistor or an insulated gate bipolar transistor (IGBT).

The resistor element R1 and the capacitor element C1 are connected via the diodes D11 and d12 to the DC output side of the three-phase diode bridge DB1. The resistor element R1 and the capacitor element C1 effectively absorb a surge voltage generated by energy discharged at the time of switching of the windings.

The second switch 62 is a circuit that is the same as or similar to the first switch 61 and includes a three-phase diode bridge DB2, a switching element Sw12, a resistor element R2, a capacitor element C2, and diodes D13 and D14. AC input terminals Tu2, Tv2, and Tw2 of the three-phase diode bridge DB2 are respectively connected to the connection terminals B1 to B3 of the AC motor 40. The resistor element R2 and the capacitor element C2 may be shared with the resistor element R1 and the capacitor element C1 of the first switch 61.

The first switch 61 and the second switch 62 are controlled by a winding switching signal Sa, described later, output from the controller 22. When the controller 22 outputs the winding switching signal Sa at a low level, the logical NOT circuit Inv1 inputs the signal at a high level to the switching element Sw11, and the switching element Sw11 enters an ON state. In addition, the winding switching signal Sa at a low level causes the switching element Sw12 to enter an OFF state. Accordingly, the connection terminals B1 to B3 of the AC motor 40 are short-circuited, and the winding state of the AC motor 40 becomes the low speed windings.

Meanwhile, when the controller 22 outputs the winding switching signal Sa at a high level, the logical NOT circuit Inv1 inputs the signal at a low level to the switching element Sw11, and the switching element Sw11 enters an OFF state. In addition, the winding switching signal Sa at a high level causes the switching element Sw12 to enter an ON state. Accordingly, the connection terminals A4 to A6 of the AC motor 40 are short-circuited, and the winding state of the AC motor 40 becomes the high speed windings.

It is simply necessary for the first switch 61 to cause the winding state of the AC motor 40 to become the low speed windings, and for the second switch 62 to cause the winding state of the AC motor 40 to become the high speed windings. The configurations of the first switch 61 and the second switch 62 are not limited to those illustrated in FIG. 3.

Configuration of Inverter Device 20

Figure 4:
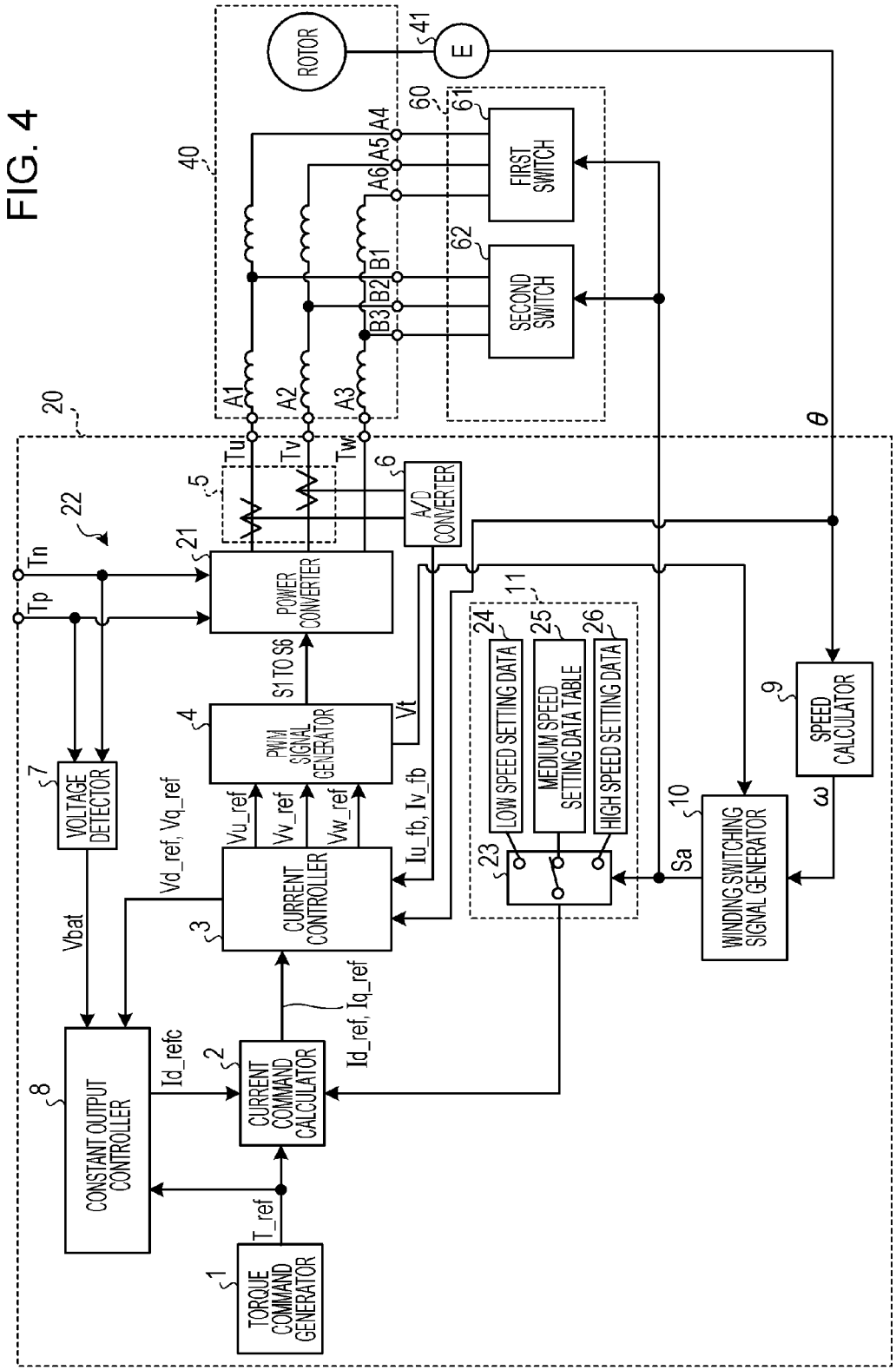
FIG. 4 is a diagram illustrating a specific configuration of a controller of the inverter device illustrated in FIG. 1.

Next, the configuration of the inverter device 20 according to the first embodiment will be described using FIGS. 3 and 4. FIG. 4 is a diagram illustrating a specific configuration of the controller 22 of the inverter device 20 according to the first embodiment.

As illustrated in FIG. 4, the controller 22 of the inverter device 20 includes a torque command generator 1, a current command calculator 2, a current controller 3, a phase-width-modulation (PWM) signal generator 4, a current detector 5, and an analog-to-digital (A/D) converter 6. The controller 22 further includes a voltage detector 7, a constant output controller 8, a speed calculator 9, a winding switching signal generator 10, and a constant switch 11. The winding switching signal generator 10, the constant switch 11, and the winding switch 60 are an example of a switch controller.

The torque command generator 1 generates a torque command T_ref, which is a target value of the amount of torque generated by the AC motor 40, and outputs the torque command T_ref to the current command calculator 2 and the constant output controller 8. Alternatively, the torque command T_ref may be input from an external controller of the inverter device 20, which is not illustrated.

The current command calculator 2 generates a d-axis current command Id_ref and a q-axis current command Iq_ref on the basis of the torque command T_ref from the torque command generator 1 and a motor constant and a control parameter from the constant switch 11.

The current command calculator 2 calculates a d-axis current command Id_ref1 on the basis of, for example, a torque-current conversion factor K, and a current phase β with respect to the q-axis direction, which is a directional vector orthogonal to the d-axis direction. The current command calculator 2 adds the d-axis current command Id_ref1 to a constant output amount Id_refc from the constant output controller 8 to obtain a d-axis current command Id_ref, and outputs the d-axis current command Id_ref to the current controller 3.

In addition, the current command calculator 2 calculates a q-axis current command Iq_ref on the basis of, for example, a d-axis inductance value Ld of the armature windings and a q-axis inductance value Lq of the armature windings, and outputs the calculated q-axis current command Iq_ref to the current controller 3.

The current controller 3 generates voltage commands Vd_ref and Vq_ref by controlling current in accordance with the d-axis current command Id_ref and the q-axis current command Iq_ref from the current command calculator 2 to flow through the AC motor 40, and converts the voltage commands Vd_ref and Vq_ref into voltage commands Vu_ref, Vv_ref, and Vw_ref of the individual phases. The current controller 3 outputs the voltage commands Vd_ref and Vq_ref to the constant output controller 8, and outputs the voltage commands Vu_ref, Vv_ref, and Vw_ref to the PWM signal generator 4.

Figure 5:
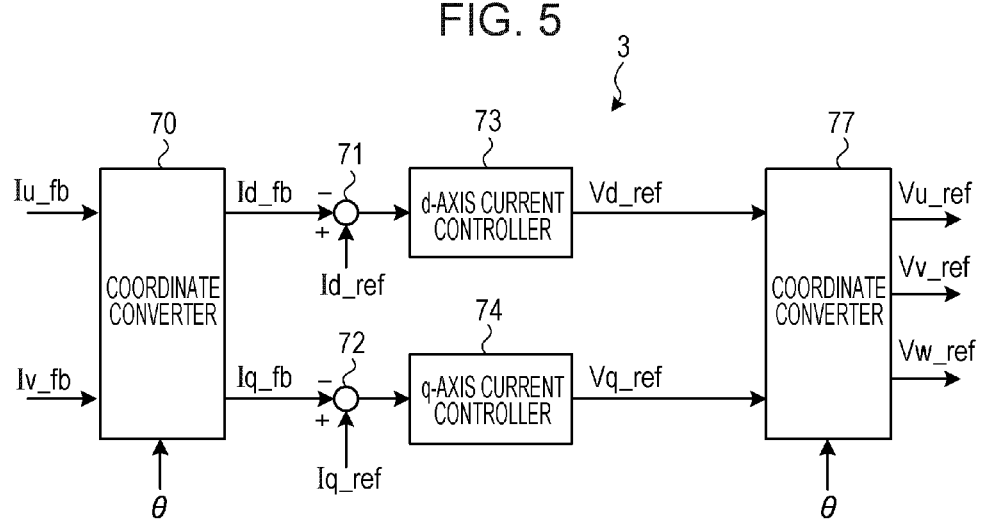
FIG. 5 is a diagram illustrating an example of a specific configuration of a current controller.

FIG. 5 is a diagram illustrating an example of the specific configuration of the current controller 3. As illustrated in FIG. 5, the current controller 3 includes coordinate converters 70 and 77, subtractors 71 and 72, a d-axis current controller 73, and a q-axis current controller 74.

The coordinate converter 70 converts detected current values Iu_fb and Iv_fb from the A/D converter 6 into current feedback values Id_fb and Iq_fb on the basis of the rotor phase θ. The subtractor 71 subtracts the d-axis current feedback value Id_fb from the d-axis current command Id_ref and outputs the subtraction result to the d-axis current controller 73. In addition, the subtractor 72 subtracts the q-axis current feedback value Iq_fb from the q-axis current command Iq_ref and outputs the subtraction result to the q-axis current controller 74.

The d-axis current controller 73 controls the subtraction result obtained by the subtractor 71 to be 0, and the q-axis current controller 74 controls the subtraction result obtained by the subtractor 72 to be 0. The d-axis current controller 73 and the q-axis current controller 74 perform, for example, proportional-plus-integral (PI) control and output voltage commands Vd_ref and Vq_ref, respectively.

The coordinate converter 77 converts the voltage commands Vd_ref and Vq_ref into voltage commands Vu_ref, Vv_ref, and Vw_ref of the U-phase, V-phase, and W-phase on the basis of the rotor phase θ, and outputs the voltage commands Vu_ref, Vv_ref, and Vw_ref to the PWM signal generator 4.

Referring back to FIG. 4, the description of the controller 22 will be continuously given. The PWM signal generator 4 generates PWM signals S1 to S6 on the basis of the results of comparison between an internally generated carrier wave signal Vt with the voltage commands Vu_ref, Vv_ref, and Vw_ref from the current controller 3, and outputs the PWM signals S1 to S6 to the power converter 21. The power converter 21 includes, for example, as illustrated in FIG. 3, switching elements Sw1 to Sw6 connected to a three-phase bridge, and diodes D1 to D6 connected in anti-parallel with the switching elements Sw1 to Sw6, respectively.

The controller 22 controls the switching elements Sw1 to Sw6 to be turned ON/OFF in response to the PWM signals S1 to S6, thereby outputting a voltage with a certain frequency and a voltage value from the power converter 21 to the AC motor 40.

The current detector 5 illustrated in FIG. 4 detects current flowing through the windings of the AC motor 40. Current values Iu_fb and Iv_fb detected by the current detector 5 are output to the A/D converter 6.

The A/D converter 6 converts the current values Iu_fb and Iv_fb detected by the current detector 5 into digital signals. The detected current values Iu_fb and Iv_fb converted by the A/D converter 6 into digital signals are output to the current controller 3.

The voltage detector 7 detects the voltage value of the DC voltage source 30, specifically, a DC voltage value Vbat across the input terminals Tp and Tn of the inverter device 20 to which the DC voltage source 30 is connected, and outputs the detected DC voltage value Vbat to the constant output controller 8.

In the case where an amplitude value Vfb of a voltage command obtained from the voltage commands Vd_ref and Vq_ref (hereinafter referred to as a voltage amplitude value Vfb) reaches an outputtable maximum voltage value Vmax based on the DC voltage value Vbat of the voltage detector 7, the constant output controller 8 calculates a constant output amount Id_refc on the basis of the voltage commands Vd_ref and Vq_ref and the maximum voltage value Vmax. The calculated constant output amount Id_refc is used for field weakening control. In this manner, constant output control is performed on the basis of the voltage amplitude value Vfb and the maximum voltage value Vmax.

Figure 6:
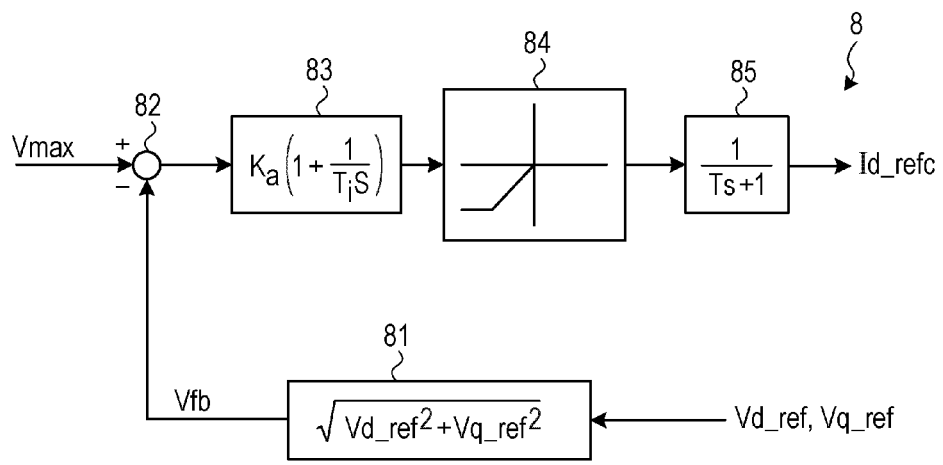
FIG. 6 is a diagram illustrating an example of a specific configuration of a constant output controller.

FIG. 6 is a diagram illustrating an example of the specific configuration of the constant output controller 8. As illustrated in FIG. 6, the constant output controller 8 includes an amplitude calculator 81, a subtractor 82, a PI controller 83, a limiter 84, and a filter 85.

The amplitude calculator 81 calculates a voltage amplitude value Vfb from the voltage commands Vd_ref and Vq_ref, and outputs the calculated voltage amplitude value Vfb as a voltage feedback value Vfb to the subtractor 82.

The subtractor 82 subtracts the voltage feedback value Vfb from the maximum voltage value Vmax, and outputs the subtraction result to the PI controller 83. The maximum voltage value Vmax is determined on the basis of the DC voltage value Vbat from the voltage detector 7 or by multiplying the DC voltage value Vbat with a coefficient, which is not illustrated.

The PI controller 83 performs PI control of the subtraction result obtained by the subtractor 82, and operates so that the voltage feedback value Vfb does not exceed the maximum voltage value Vmax. To this end, the limiter 84 limits the output of the PI controller 83 to be 0 when the output is a positive value and limits the output to a certain value when the output is a negative value, and outputs the limited value to the filter 85. The output value of the limiter 84 is output as a constant output value Id_refc via the filter 85. Note that the filter 85 is provided as occasion calls.

Referring back to FIG. 4, the description of the controller 22 will be continuously given. The speed calculator 9 calculates the rotation speed ω of the AC motor 40 on the basis of the rotor phase θ from the position detector 41. The calculated rotation speed ω is output to the winding switching signal generator 10.

The winding switching signal generator 10 causes winding switching to be executed by outputting a winding switching signal Sa to the winding switch 60. Specifically, the winding switching signal generator 10 generates a winding switching signal Sa in accordance with the rotation speed co from the speed calculator 9, and outputs the winding switching signal Sa to the winding switch 60 and the constant switch 11.

The winding switching signal Sa is a signal synchronized with the carrier wave signal Vt from the PWM signal generator 4, and is generated on the basis of a signal obtained by dividing the frequency of the carrier wave signal Vt. The frequency of the carrier wave signal Vt is, for example, 10 k Hz, and the frequency of a signal obtained by dividing the frequency of the carrier wave signal Vt is, for example, 1 k Hz. The winding switching processing performed by the controller 22 will be described later using FIGS. 7 to 13.

The constant switch 11 holds low speed and high speed motor constants and control parameter data (hereinafter referred to as setting data). In response to the winding switching signal Sa from the winding switching signal generator 10, the constant switch 11 outputs selected setting data to the current command calculator 2, and switches to the motor constant and control parameter that match the winding state of the AC motor 40.

The setting data held by the constant switch 11 includes, for example, the torque-current conversion coefficient K, the current phase β, the armature winding inductance values Ld and Lq, an armature flux linkage φ, and an armature winding resistance value R.

The constant switch 11 includes a switch 23, low speed setting data 24, a medium speed setting data table 25, and high speed setting data 26. Setting data corresponding to the time ratio of the winding switching signal Sa is set in the medium speed setting data table 25.

The constant switch 11 switches the switch 23 in response to the winding switching signal Sa, and obtains and outputs setting data in response to the winding switching signal Sa from the low speed setting data 24, the medium speed setting data table 25, and the high speed setting data 26. Instead of the medium speed setting data table 25, the constant switch 11 may output setting data in response to the winding switching signal Sa by performing an arithmetic operation of calculating setting data in response to the winding switching signal Sa.

Winding Switching Processing Performed by Controller 22

Next, the winding switching processing performed by the controller 22 will be specifically described. The controller 22 sets the winding state of the AC motor 40 to one of the low speed windings, a switching state between the low speed windings and the high speed windings, and the high speed windings in accordance with the rotation speed ω from the speed calculator 9.

Figure 7:
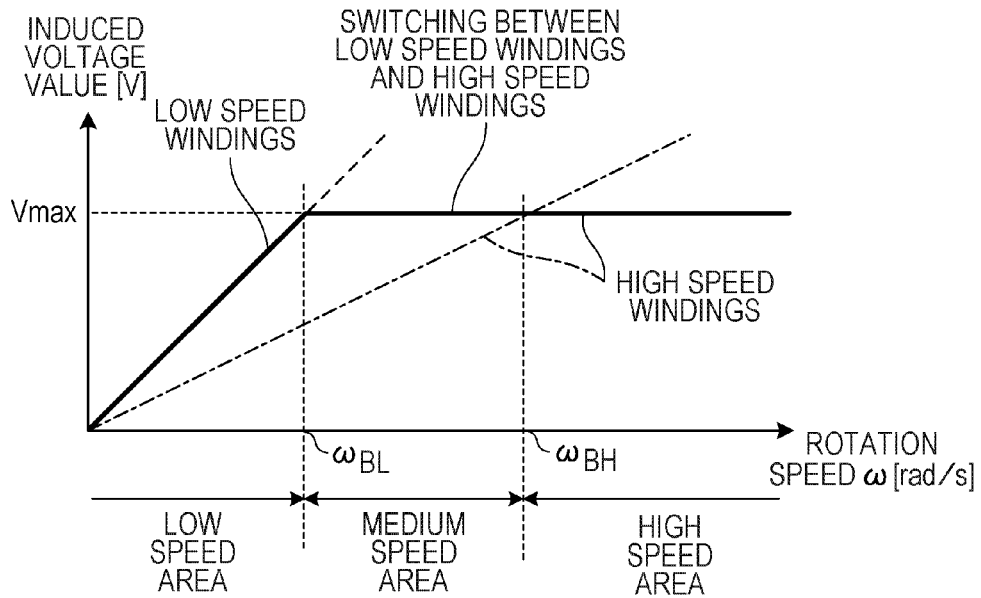
FIG. 7 is a diagram illustrating the relationship among the rotation speed, induced voltage value, and winding state of the AC motor.

FIG. 7 is a diagram illustrating the relationship among the rotation speed ω, induced voltage value, and winding state of the AC motor 40. As illustrated in FIG. 7, in the case of a low speed area in which the rotation speed ω is less than or equal to a first reference rotation speed $ω_{BL}$, the winding switching signal generator 10 outputs the winding switching signal Sa at a low level to the winding switch 60. Accordingly, the winding state of the AC motor 40 becomes the low speed windings. Note that the first reference rotation speed $ω_{BL}$ is, for example, a rotation speed ω at which the induced voltage value of the AC motor 40 in the case where the winding state is the low speed windings becomes the maximum voltage value Vmax.

In addition, in the case of a high speed area where the rotation speed ω is greater than or equal to a second reference rotation speed $ω_{BH}$, the winding switching signal generator 10 outputs the winding switching signal Sa at a high level to the winding switch 60. Accordingly, the winding state of the AC motor 40 becomes the state of the high speed windings. Note that the second reference rotation speed $ω_{BH}$ is, for example, a rotation speed ω at which the induced voltage value of the AC motor 40 in the case where the winding state is the high speed windings becomes the maximum voltage value Vmax.

Meanwhile, in the case of a medium speed area in which the rotation speed ω is greater than the first reference rotation speed $ω_{BL}$ and less than the second reference rotation speed $ω_{BH}$, the winding switching signal generator 10 outputs the winding switching signal Sa at a certain frequency (such as 1 kHz) that becomes a high level at a time ratio in accordance with the rotation speed ω to the winding switch 60. Accordingly, the winding state of the AC motor 40 is alternately switched between the low speed windings and the high speed windings.

In the case where the rotation speed ω is greater than the first reference rotation speed $ω_{BL}$ and less than the second reference rotation speed $ω_{BH}$, if the winding state of the AC motor 40 is the state of the low speed windings, the induced voltage value of the AC motor 40 reaches the maximum voltage value Vmax, and thus, the induced voltage value of the AC motor 40 is maintained at the maximum voltage value Vmax by field weakening control. Meanwhile, if the winding state of the AC motor 40 is the high speed windings, the induced voltage value of the AC motor 40 does not reach the maximum voltage value Vmax.

To this end, in the case where the rotation speed ω is greater than the first reference rotation speed $ω_{BL}$ and less than the second reference rotation speed $ω_{BH}$, the winding state of the AC motor 40 is alternately switched between the low speed windings and the high speed windings, and the induced voltage value of the AC motor 40 is maintained to be less than or equal to the maximum voltage value Vmax without relying on field weakening control.

Figure 8:
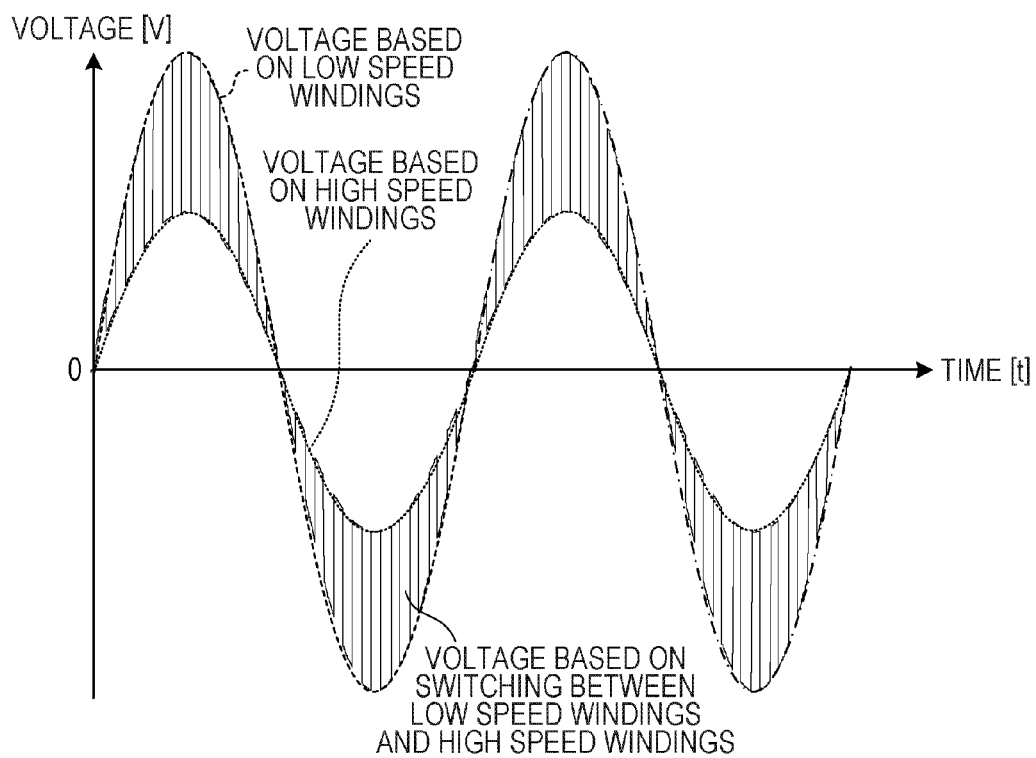
FIG. 8 is a diagram illustrating an example of the waveform of an output voltage of the inverter device in the case where the winding state of the AC motor is a switching status between low speed windings and high speed windings.

Accordingly, as illustrated in FIG. 8, a voltage (hereinafter referred to as a medium speed winding voltage) between a voltage based on the low speed windings (hereinafter referred to as a low speed winding voltage) and a voltage based on the high speed windings (hereinafter referred to as a high speed winding voltage) can be generated. FIG. 8 is a diagram illustrating an example of the waveform of an output voltage of the inverter device 20 in the case where the winding state of the AC motor 40 is a switching state between the low speed windings and the high speed windings.

The medium speed winding voltage in a medium speed operation is generated by a voltage based on the low speed winding and a voltage based on the high speed windings, as illustrated in FIG. 8. Thus, the medium speed winding voltage can be arbitrarily adjusted between the low speed winding voltage and the high speed winding voltage by adjusting a time in which the winding state of the AC motor 40 is the low speed windings (hereinafter referred to as a low speed winding time) and a time in which the winding state of the AC motor 40 is the high speed windings (hereinafter referred to as a high speed winding time) in a medium speed operation. Accordingly, in an area where the shaft output of the AC motor 40 becomes constant output by using a known method, if the inverter control according to the present disclosure is performed, a highly efficient area can be enlarged by alternately switching between constant torque control with the low speed windings and constant torque control with the high speed windings.

Figure 9:
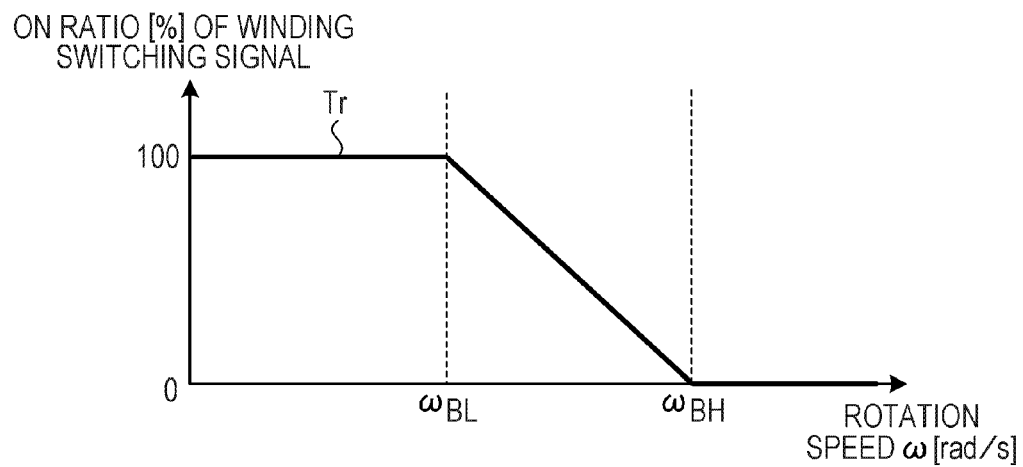
FIG. 9 is a diagram illustrating the relationship between the rotation speed and the ON ratio of a winding switching signal.

FIG. 9 is a diagram illustrating the relationship between the rotation speed ω and the ON ratio Tr of the winding switching signal Sa. The ON ratio Tr is the ratio between a low level and a high level. In the case where the low speed winding time is 100%, the ON ratio Tr is 100%; in the case where the high speed winding time is 100%, the ON ratio Tr is 0%. As illustrated in FIG. 9, in the case where the rotation speed ω is less than or equal to the first reference rotation speed $ω_{BL}$, the ON ratio Tr is 100%; in the case where the rotation speed ω is greater than or equal to the second reference rotation speed $ω_{BH}$, the ON ratio Tr is 0%.

Figure 10:
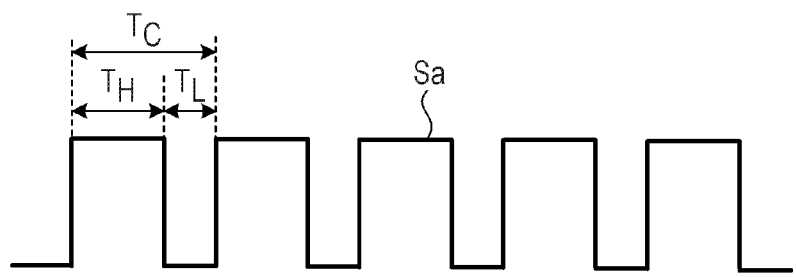
FIG. 10 is a diagram illustrating an example of the waveform of the winding switching signal.

In the case where the rotation speed ω is greater than the first reference rotation speed $ω_{BL}$ and is less than the second reference rotation speed $ω_{BH}$, the ON ratio Tr is set to approach 0% as the rotation speed ω becomes faster. FIG. 10 is a diagram illustrating an example of the waveform of the winding switching signal Sa. As illustrated in FIG. 10, for the winding switching signal Sa, an ON period $T_L$ in which the winding switching signal Sa is at a low level and an OFF period $T_H$ in which the winding switching signal Sa is at a high level are set in every cycle Tc. The ON ratio Tr of the winding switching signal Sa is represented by $T_L/T_C$.

The winding switching signal Sa is input to the constant switch 11, as described earlier. Accordingly, setting data in response to the winding switching signal Sa is output from the constant switch 11. Specifically, in the case where the ON ratio Tr of the winding switching signal Sa is 0%, the constant switch 11 switches the switch 23 to the low speed setting data 24, and obtains and outputs setting data from the low speed setting data 24. Meanwhile, in the case where the ON ratio Tr of the winding switching signal Sa is 100%, the constant switch 11 switches the switch 23 to the high speed setting data 26, and obtains and outputs setting data from the high speed setting data 26.

In addition, in the case where the time ratio of the winding switching signal Sa exceeds 0% and falls below 100%, the constant switch 11 switches the switch 23 to the medium speed setting data table 25. In the medium speed setting data table 25, setting data in accordance with the ON ratio Tr of the winding switching signal Sa is set. The constant switch 11 obtains and outputs setting data in accordance with the ON ratio Tr of the winding switching signal Sa from the medium speed setting data table 25. Accordingly, setting data can be consecutively switched.

In the example illustrated in FIG. 4, setting data in accordance with the ON ratio Tr of the winding switching signal Sa is set in the table. Alternatively, instead of the arithmetic operation table, setting data in accordance with the ON ratio Tr of the winding switching signal Sa may be output by an arithmetic operation that calculates setting data in accordance with the ON ratio Tr of the winding switching signal Sa.

In this manner, the constant switch 11 outputs setting data in response to the winding switching signal Sa, and the setting data is input to the current command calculator 2. Accordingly, the current command calculator 2 switches to the motor constant and control parameter that match the winding state of the AC motor 40.

FIG. 11 is a diagram illustrating the relationship among the ON ratio of the switching elements Sw11 and Sw12 and the time ratio of the low speed windings and the high speed windings in the case where the AC motor 40 is accelerated. As illustrated in FIG. 11, in the case where the AC motor 40 is accelerated/decelerated, the time ratio of the low speed windings and the time ratio of the high speed windings consecutively change between 0% and 100%, and also setting data output from the constant switch 11 consecutively changes.

Therefore, in the drive system 100 according to the first embodiment, the AC motor 40 can be operated in a manner equivalent to the case in which an AC motor whose characteristics change as illustrated in FIG. 12 is virtually operated. FIG. 12 is a diagram illustrating the relationship between the rotation speed ω and induced voltage value of the AC motor 40 in the drive system 100.

Accordingly, the drive system 100 according to the first embodiment can further enlarge a highly efficient area by alternately switching the winding state between the low speed windings and the high speed windings at the time ratio in accordance with the rotation speed ω. In addition, effects caused by switching the windings can be lessened, compared with the case in which the winding state of the AC motor 40 is suddenly switched.

In addition, as has been described above, the winding switching signal generator 10 generates the winding switching signal Sa as a signal synchronized with the carrier wave signal Vt from the PWM signal generator 4. Accordingly, the effect of a switching noise caused by switching the windings can be further suppressed.

Figure 13:
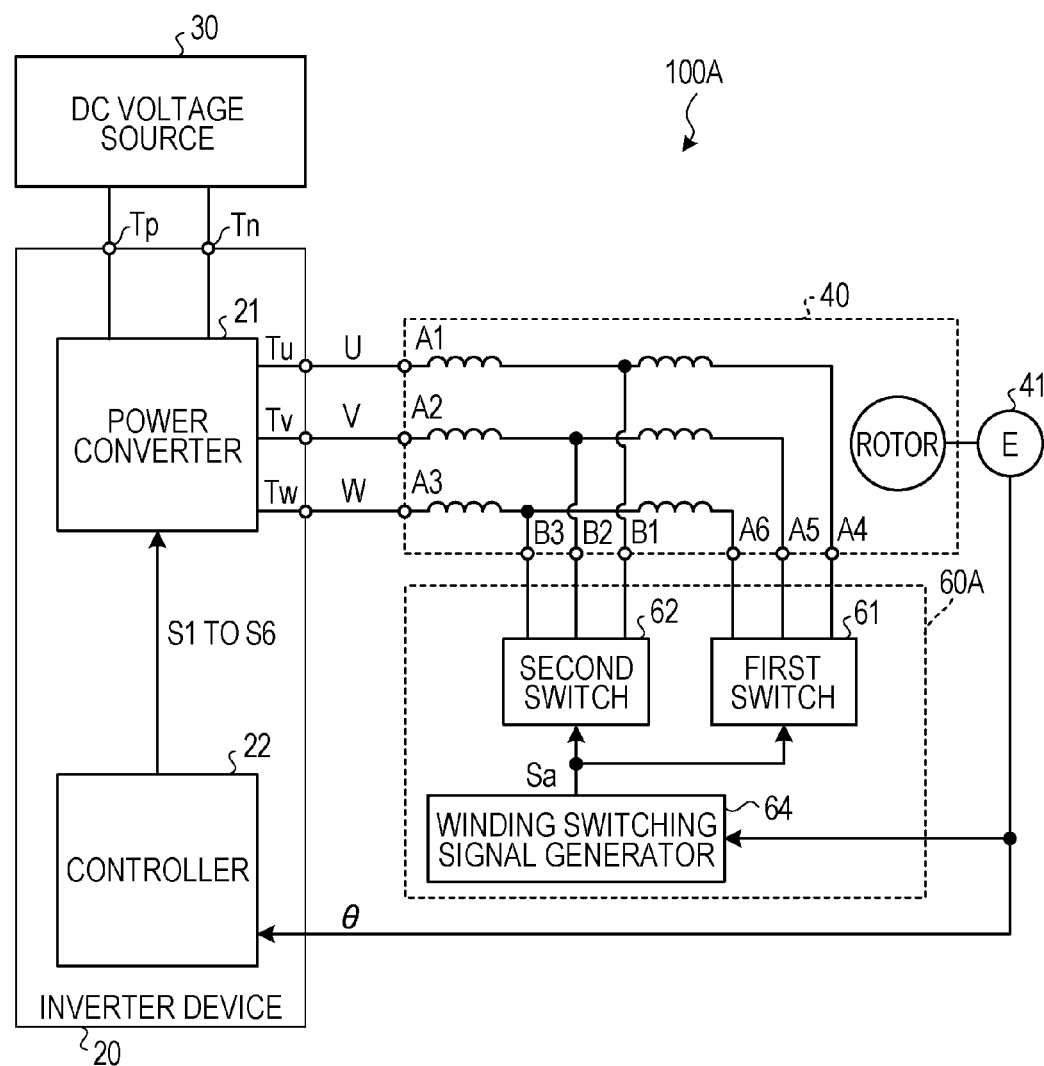
FIG. 13 is a diagram illustrating another configuration of the motor drive system according to the first embodiment.

Alternatively, the winding switching signal Sa may be a signal out of synchronization with the carrier wave signal Vt from the PWM signal generator 4, as illustrated in FIG. 13. FIG. 13 is a diagram illustrating another configuration of the drive system according to the first embodiment. A drive system 100A illustrated in FIG. 13 includes, besides the winding switching signal generator 10 of the inverter device 20, a winding switching signal generator 64 of a winding switch 60A. Accordingly, in the case where the inverter device 20 and the winding switch 60A are at distant places, the drive system 100A can dispense with the work of routing cables, and independent control can be performed.

In addition, in the case where the winding switching signal Sa is a signal synchronized with the carrier wave signal Vt, if the windings are switched, the detection timing of the detected current values Iu_fb and Iv_fb detected by the current detector 5 may be concurrent with the winding switching timing of the AC motor 40. Immediately after the windings of the AC motor 40 are switched, if the winding state of the AC motor 40 changes, the accuracy of the detected current values Iu_fb and Iv_fb become deteriorated.

To this end, the controller 22 does not use detected current values Iu_fb and Iv_fb detected by the current detector 5 at the winding switching timing of the AC motor 40, but uses detected current values Iu_fb and Iv_fb detected at one prior timing to generate the voltage commands Vd_ref and Vq_ref. Accordingly, the accuracy deterioration of the voltage output from the power converter 21 can be suppressed.

Second Embodiment

Next, a drive system according to the second embodiment will be described. In the drive system 100 according to the first embodiment, the AC motor 40 is operated at a medium speed by performing switching control between the low speed windings and the high speed windings. In the drive system according to the second embodiment, instead of a medium speed operation, the AC motor 40 is operated in a transition operation. In the following description, points different from the drive system 100 according to the first embodiment are mainly discussed, and elements with the same or similar functions as those in the first embodiment are given the same reference numerals, descriptions of which are omitted.

Figure 14:
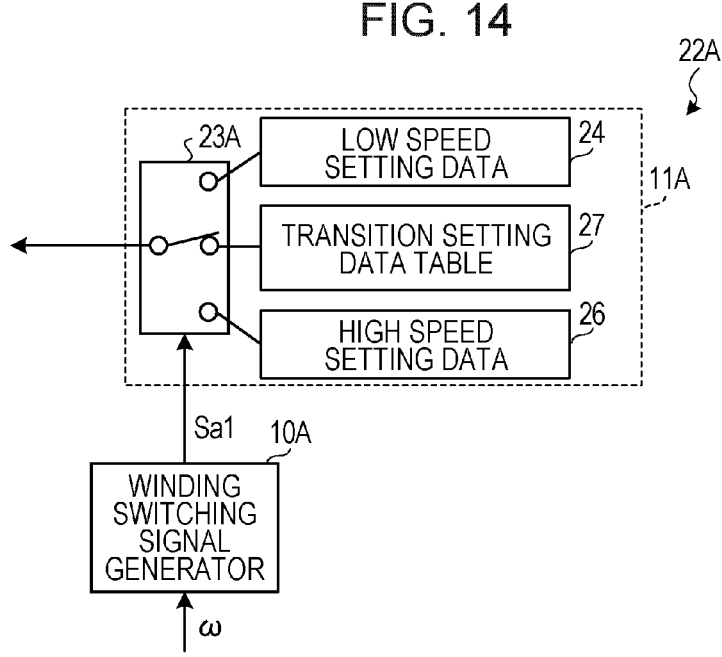
FIG. 14 is a diagram illustrating the configuration of a controller of the inverter device according to a second embodiment.

FIG. 14 is a diagram illustrating the configuration of a controller 22A of the inverter device 20 according to the second embodiment. In FIG. 14, only a winding switching signal generator 10A and a constant switch 11A are illustrated, and other configurations are omitted.

In the case where the rotation speed ω is less than or equal to a reference rotation speed $\omega_{BR}$, the winding switching signal generator 10A outputs a winding switching signal Sa1 at a low level to the winding switch 60. In the case where the rotation speed ω is greater than or equal to the reference rotation speed $\omega_{BR}$, the winding switching signal generator 10A outputs the winding switching signal Sa1 at a high level to the winding switch 60.

Meanwhile, in the case where the rotation speed ω accelerates and becomes greater than the reference rotation speed $\omega_{BR}$ or decelerates and becomes less than the reference rotation speed $\omega_{BR}$, the winding switching signal generator 10A outputs the winding switching signal Sa1 whose time ratio consecutively changes between 0% and 100% in accordance with time to the winding switch 60. Accordingly, while the winding state of the AC motor 40 is alternately switched between the low speed windings and the high speed windings, transition from a low speed operation to a high speed operation and transition from a high speed operation to a low speed operation are performed. As with the case of the winding switching signal Sa according to the first embodiment, the winding switching signal Sa1 is a pulse signal at a certain frequency (such as 1 kHz).

Figure 15:
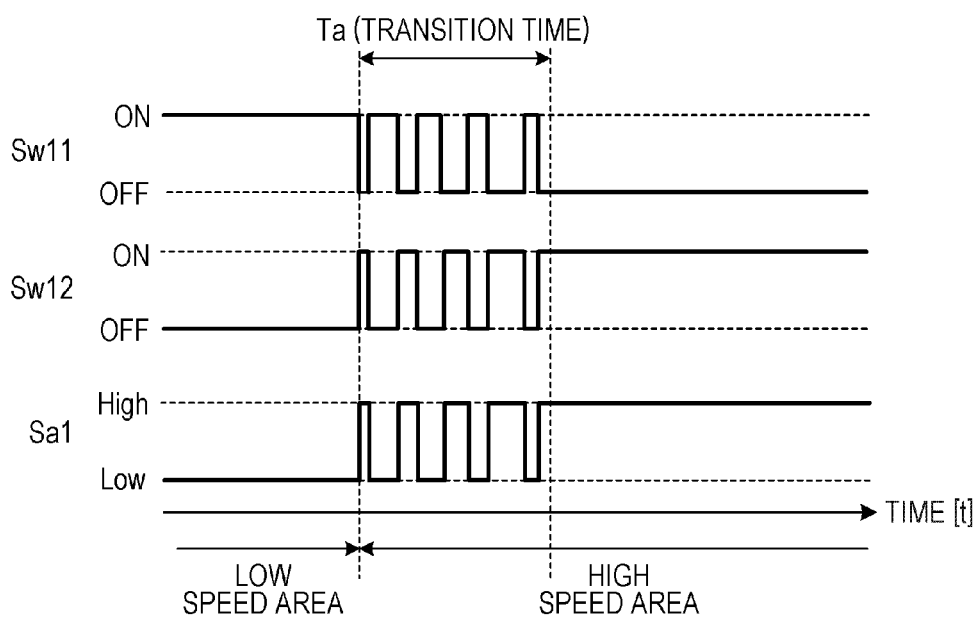
FIG. 15 is a diagram illustrating the state of the switching elements and the state of the winding switching signal in the case where the AC motor is accelerated from a low speed area to a high speed area.

FIG. 15 is a diagram illustrating the state of the switching elements Sw11 and Sw12 and the state of the winding switching signal Sa1 in the case where the AC motor 40 is accelerated from a low speed area to a high speed area. As illustrated in FIG. 15, in the case where the AC motor 40 is accelerated from a low speed area to a high speed area, in the low speed area, the winding switching signal Sa1 is at a low level, the switching element Sw11 is switched ON, the switching element Sw12 is switched OFF, and the winding state of the AC motor 40 becomes the low speed windings.

Thereafter, when the rotation speed ω exceeds the reference rotation speed $\omega_{BR}$ and reaches a high speed area, for a certain time Ta, the time ratio of the winding switching signal Sa1 consecutively changes from 0% to 100% in accordance with time, and the switching elements Sw11 and Sw12 are switched ON/OFF in accordance with the time ratio of the winding switching signal Sa1. After the certain time Ta elapses, the winding switching signal Sa1 becomes a high level (time ratio is 100%), the switching element Sw11 is switched OFF, the switching element Sw12 is switched ON, and the winding state of the AC motor 40 becomes the high speed windings.

Accordingly, in transition from a state in which one type of the low speed windings and the high speed windings is connected to the power converter 21 to a state in which the other type of windings is connected to the power converter 21, the winding switching signal generator 10A executes switching control that alternately switches the winding state between the low speed windings and the high speed windings while shortening the time in which the one type of windings is connected to the power converter 21.

The constant switch 11A includes a switch 23A, the low speed setting data 24, the high speed setting data 26, and a transition setting data table 27. In the case where the winding switching signal Sa1 is at a low level, the constant switch 11A outputs the low speed setting data 24 from the switch 23A. In the case where the winding switching signal Sa1 is at a high level, the constant switch 11A outputs the high speed setting data 26 from the switch 23A.

Further, in the case where the winding switching signal Sa1 is changing between a low level and a high level, the switch 23A changes setting data set in the transition setting data table 27 and outputs this setting data for a certain period. In the transition setting data table 27, setting data in accordance with the ON ratio of the winding switching signal Sa1 is set. Accordingly, the constant switch 11A can change and output the setting data for a certain period.

Accordingly, in the drive system according to the second embodiment, in transition from a low speed area to a high speed area or in transition from a high speed area to a low speed area, transition between a low speed operation and a high speed operation is performed while the winding state of the AC motor 40 is alternately switched between the low speed windings and the high speed windings. Thus, effects caused by switching the windings can be lessened, compared with the case in which the winding state of the AC motor 40 is suddenly switched.

As with the case of the first embodiment, the winding switching signal Sa1 may be a signal out of synchronization with the carrier wave signal Vt from the PWM signal generator 4. Besides the winding switching signal generator 10A of the inverter device 20, the winding switching signal generator 64 may be provided in the winding switch 60. In addition, the controller 22A may not use detected current values Iu_fb and Iv_fb detected by the current detector 5 at the winding switching timing of the AC motor 40, but may use detected current values Iu_fb and Iv_fb detected at one prior timing to generate the voltage commands Vd_ref and Vq_ref.

Third Embodiment

In the drive system 100 according to the first embodiment, the connection state of the armature windings is changed by changing the number of windings of a star (Y) connection. In a drive system according to the third embodiment, the connection state of the armature windings is changed by switching between the star connection and a delta (Δ) connection. In the following description, points different from the drive system 100 according to the first embodiment are mainly discussed, and elements with the same or similar functions as those in the first embodiment are given the same reference numerals, descriptions of which are omitted.

Figure 16:
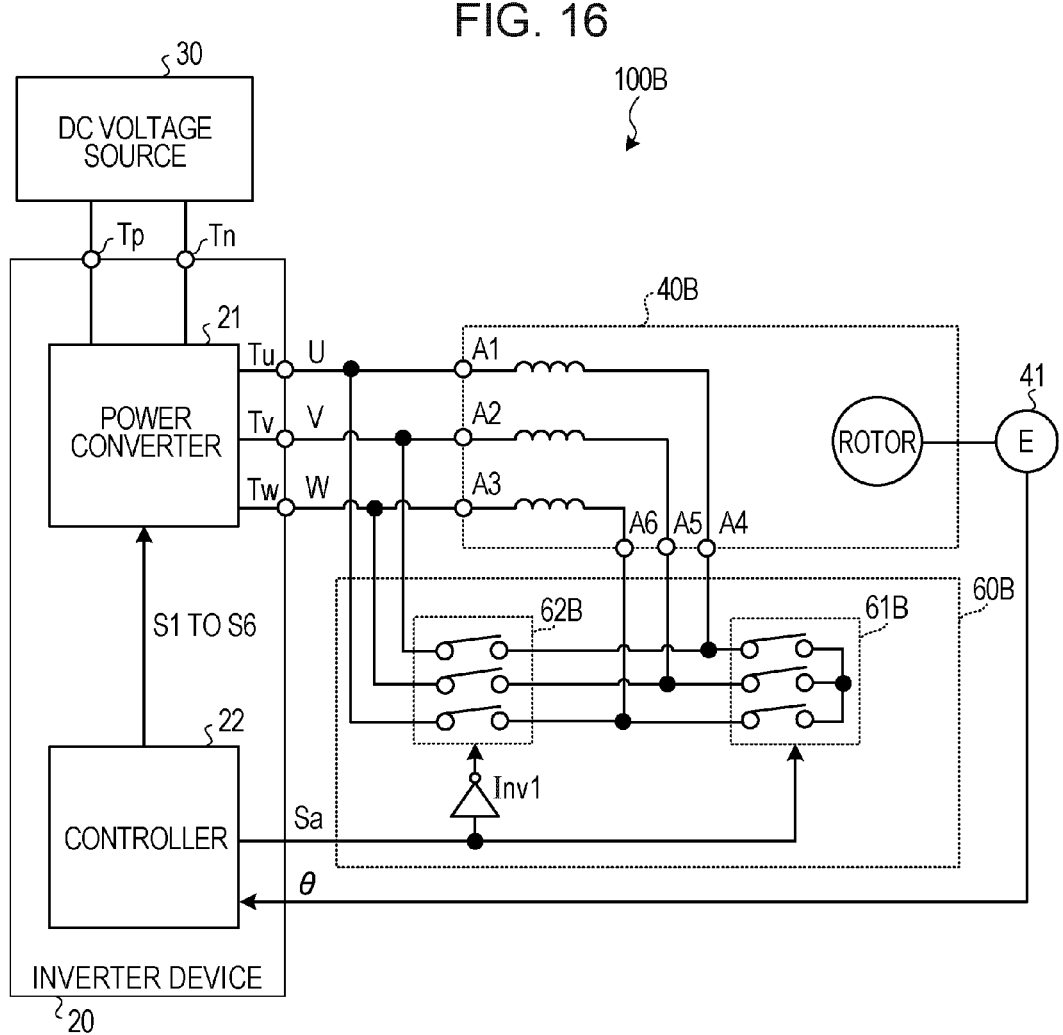
FIG. 16 is a diagram illustrating the configuration of a drive system according to a third embodiment.

FIG. 16 is a diagram illustrating the configuration of a drive system 100B according to the third embodiment. As illustrated in FIG. 16, an AC motor 40B is provided with connection terminals A1 to A6 for extracting two ends of the armature windings for the individual phases. A winding switch 60B is connected to these connection terminals A1 to A6.

The winding switch 60B includes a first switch 61B connected to the connection terminals A4 to A6 of the AC motor 40B, a second switch 62B connected to the connection terminals A1 to A3 of the AC motor 40B, and the logical NOT circuit Inv1. Switches constituting the first switch 61B and the second switch 62B are constituted by, for example, semiconductor elements.

Figure 17:
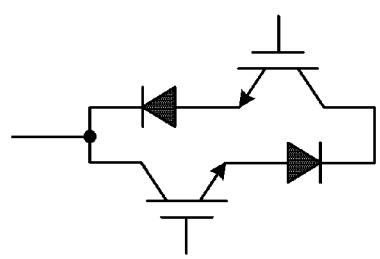
FIG. 17 is a diagram illustrating an example of each switch configuring a first switch and a second switch illustrated in FIG. 16.

FIG. 17 is a diagram illustrating an example of each of the switches constituting the first switch 61B and the second switch 62B. In the example illustrated in FIG. 17, each switch is configured by an anti-parallel connection of series circuits each including a diode and a switching element. Alternatively, this configuration may be different as long as the configuration uses a semiconductor element that can perform high-speed connection/opening for AC voltage current.

The controller 22 of the inverter device 20 causes the first switch 61B to operate, thereby short-circuiting the termination ends of the armature windings of the AC motor 40B and switching the winding state of the AC motor 40B to a star connection, which corresponds to the low speed windings. Meanwhile, the controller 22 of the inverter device 20 causes the second switch 62B to operate, thereby connecting one ends of the armature windings to the other ends of the armature windings of different phases and switching the winding state of the AC motor 40B to a delta connection, which corresponds to the high speed windings.

The controller 22 causes the first switch 61B to operate in a low speed operation and causes the second switch 62B to operate in a high speed operation, thereby switching the winding state. Further, as with the case of the first and second embodiments, the controller 22 executes switching control that alternately switches the winding state between the low speed windings and the high speed windings at a time ratio in accordance with the speed of the AC motor 40B in a speed area between a low speed operation based on the low speed windings and a high speed operation based on the high speed windings.

Accordingly, since the drive system 100B according to the third embodiment alternately switches the connection state between the star connection and the delta connection at a time ratio in accordance with the speed of the AC motor 40B, a highly efficient area can be enlarged, as with the cases of the drive system 100 according to the first embodiment.

Instead of switching the connection state between the star connection and the delta connection, the winding state of the armature windings may be switched by changing the number of windings of the delta Δ connection. As with the case of the second embodiment, the controller 22A may be provided instead of the controller 22. In this case, in transition from a low speed area to a high speed area or in transition from a high speed area to a low speed area, the controller 22A may perform transition between a low speed operation and a high speed operation while alternately switching the winding state of the AC motor 40B between the star connection and the delta connection.

Fourth Embodiment

In the drive system 100 according to the first embodiment, the winding state of the armature windings is switched by changing the position of a neutral point of the armature windings. In a drive system according to the fourth embodiment, the winding state of the armature windings is switched without changing the position of the neutral point. In the following description, points different from the drive system 100 according to the first embodiment are mainly discussed, and elements with the same or similar functions as those in the first embodiment are given the same reference numerals, descriptions of which are omitted.

Figure 18:
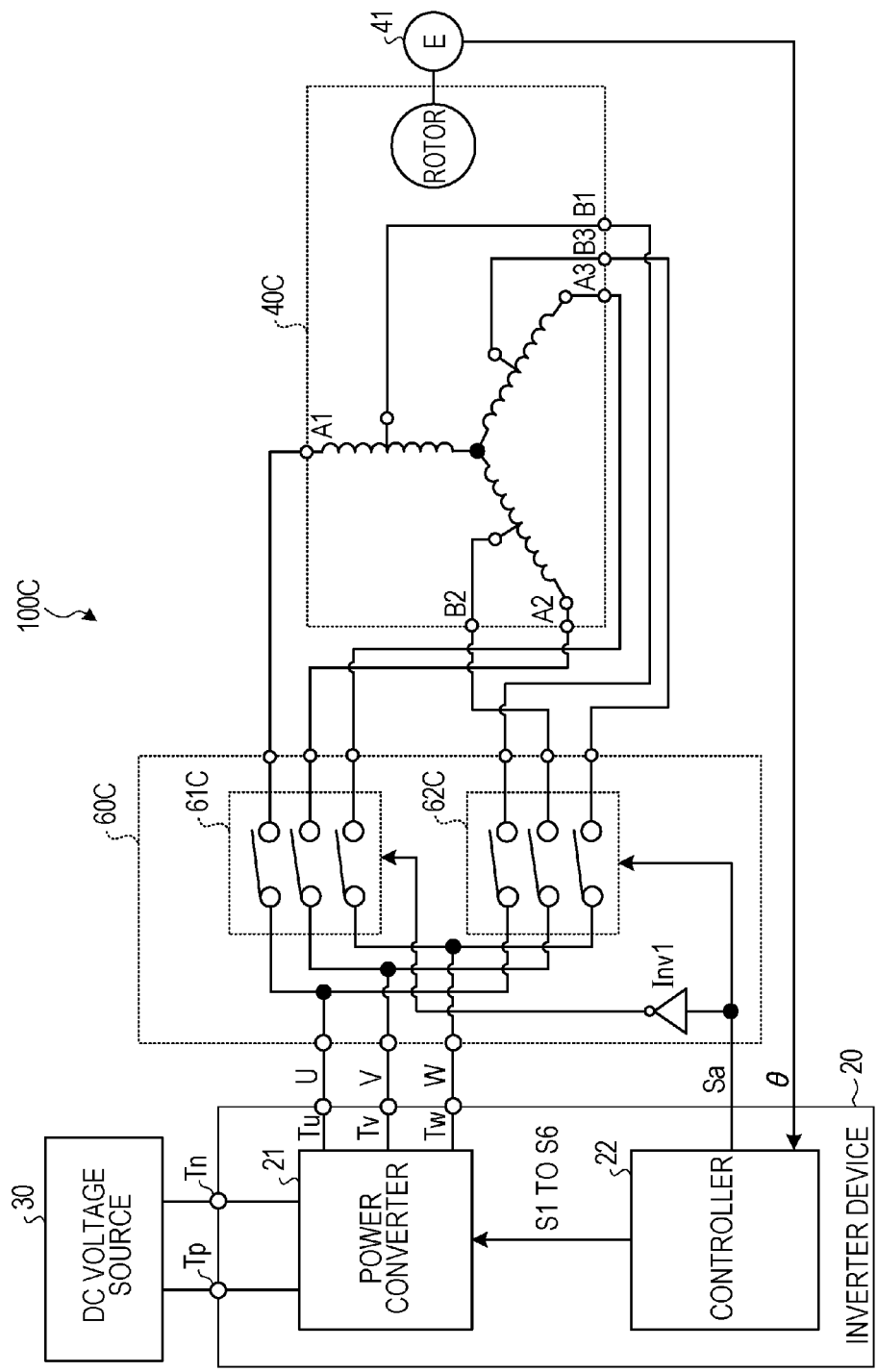
FIG. 18 is a diagram illustrating the configuration of a drive system according to a fourth embodiment.

FIG. 18 is a diagram illustrating the configuration of a drive system 100C according to the fourth embodiment. As illustrated in FIG. 18, an AC motor 40C is provided with, for the individual phases, connection terminals A1 to A3 for extracting one ends of the armature windings and connection terminals B1 to B3 for extracting the midpoints of the armature windings. A winding switch 60C is connected to the connection terminals A1 to A3 and B1 to B3.

The winding switch 60C includes a first switch 61C connected to the connection terminals A1 to A3 of the AC motor 40C, a second switch 62C connected to the connection terminals B1 to B3 of the AC motor 40C, and the logical NOT circuit Inv1. Switches constituting the first switch 61C and the second switch 62C are constituted by semiconductor elements so that connection/opening for AC voltage current can be performed at a high speed (for example, see FIG. 17).

The controller 22 of the inverter device 20 causes the first switch 61C to operate, thereby connecting the connection terminals A1 to A3 of the AC motor 40C to the power converter 21 and switching the winding state of the AC motor 40C. Accordingly, the impedance of the AC motor 40C is maximized. This winding state is called the low speed windings.

Meanwhile, the controller 22 of the inverter device 20 causes the second switch 62C to operate, thereby connecting the connection terminals B1 to B3 of the AC motor 40C to the power converter 21 and switching the winding state of the AC motor 40C. Accordingly, the impedance of the AC motor 40C decreases. This winding state is called the high speed windings.

The controller 22 causes the first switch 61C to operate in a low speed operation and causes the second switch 62C to operate in a high speed operation, thereby switching the winding state. Further, the controller 22 executes switching control that alternately switches the winding state between the low speed windings and the high speed windings at a time ratio in accordance with the speed of the AC motor 40C in a speed area between a low speed operation based on the low speed windings and a high speed operation based on the high speed windings.

Accordingly, since the drive system 100C according to the fourth embodiment alternately switches the winding state of the star connection between the low speed windings and the high speed windings, as with the case of the drive system 100 according to the first embodiment, a highly efficient area can be enlarged, as with the cases of the drive system 100 according to the first embodiment.

As with the case of the second embodiment, the controller 22A may be provided instead of the controller 22. In this case, in transition from a low speed area to a high speed area or in transition from a high speed area to a low speed area, the controller 22A may perform transition between a low speed operation and a high speed operation while alternately switching the winding state between the low speed windings and the high speed windings of the AC motor 40C.

Fifth Embodiment

In the drive systems 100 and 100A to 100C according to the above-described embodiments, switching between the two winding states is performed. In a drive system according to the fifth embodiment, switching among three winding states is performed. In the following description, an example in which the number of windings of the star connection is switched among three levels will be described by way of example. It is only necessary to switch among three or more winding states. For example, the number of windings of the delta connection may be switched among three or more levels. In addition, in the following description, points different from the drive system 100 according to the first embodiment are mainly discussed, and elements with the same or similar functions as those in the first embodiment are given the same reference numerals, descriptions of which are omitted.

Figure 19:
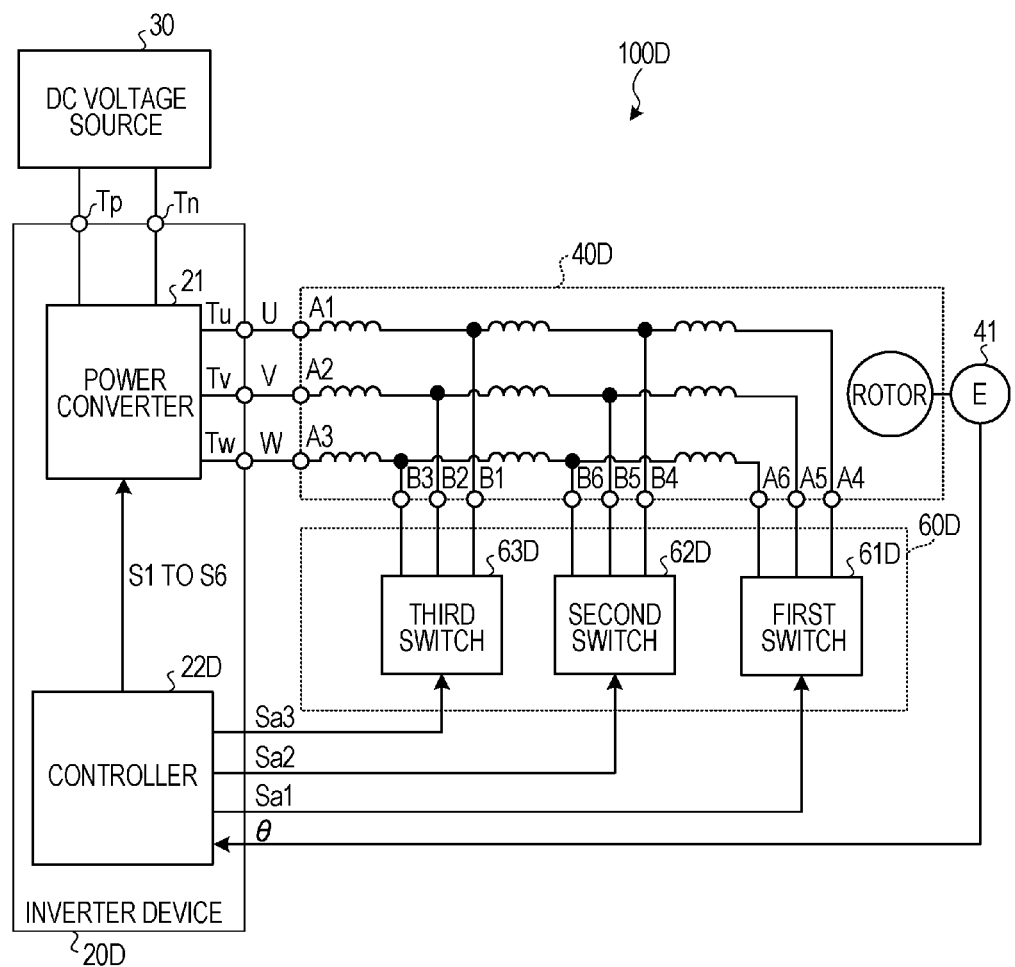
FIG. 19 is a diagram illustrating the configuration of a drive system according to a fifth embodiment.

FIG. 19 is a diagram illustrating the configuration of a drive system 100D according to the fifth embodiment. As illustrated in FIG. 19, in an AC motor 40D, a winding switch 60D is connected to connection terminals A1 to A6 for extracting two ends of the armature windings and connection terminals B1 to B6 provided at middle portions of the armature windings for the individual phases.

The winding switch 60D includes a first switch 61D connected to the connection terminals A4 to A6 of the AC motor 40D, a second switch 62D connected to the connection terminals B4 to B6 of the AC motor 40D, and a third switch 63D connected to the connection terminals B1 to B3 of the AC motor 40D. The first to third switches 61D, 62D, and 63D have the same or similar configuration as the first switch 61 and the second switch 62 (see FIG. 3). Switches constituting the first to third switches 61D, 62D, and 63D are constituted by semiconductor elements so that connection/opening for AC voltage current can be performed at a high speed (for example, see FIG. 17).

Figure 20:
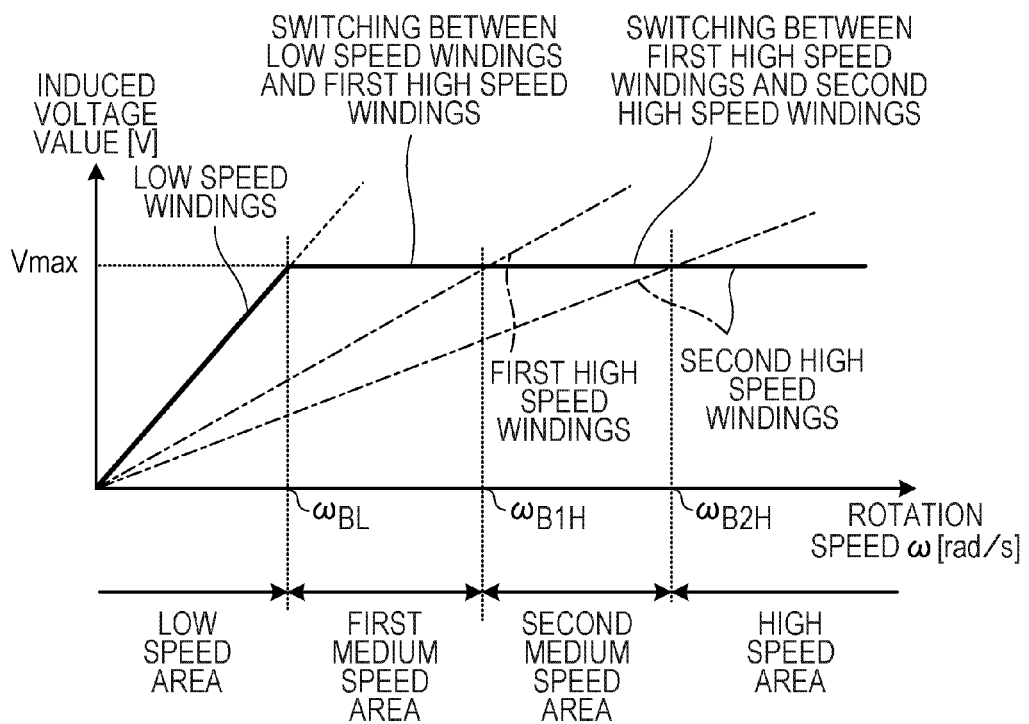
FIG. 20 is a diagram illustrating the relationship among the rotation speed, induced voltage value, and winding state of the AC motor.

FIG. 20 is a diagram illustrating the relationship between the rotation speed ω and winding state of the AC motor 40D. As illustrated in FIG. 20, a controller 22D of the inverter device 20D switches the winding state in response to the rotation speed ω among a low speed area, a first medium speed area, a second medium speed area, and a high speed area. This switching is performed by winding switching signals Sa1 to Sa3.

Specifically, in the case of the low speed area in which the rotation speed ω is less than or equal to a first reference rotation speed $\omega_{BL}$, the controller 22D outputs the winding switching signal Sa1 at a high level and the winding switching signals Sa2 and Sa3 at a low level. Accordingly, the connection terminals A4 to A6 of the AC motor 40D are connected to one another to form a neutral point, and the impedance of the AC motor 40D is maximized.

In the case of the high speed area in which the rotation speed ω is greater than or equal to a third reference rotation speed $\omega_{B2H}$, the controller 22D outputs the winding switching signal Sa3 at a high level and the winding switching signals Sa1 and Sa2 at a low level. Accordingly, the connection terminals B1 to B3 of the AC motor 40D are connected to one another to form a neutral point, and the impedance of the AC motor 40D is minimized.

Meanwhile, in the case of the first medium speed area in which the rotation speed ω is greater than the first reference rotation speed $\omega_{BL}$ and less than a second reference rotation speed $\omega_{B1H}$, the controller 22D outputs the winding switching signal Sa3 at a low level and the winding switching signals Sa1 and Sa2 which alternately become a high level. Accordingly, the controller 22D executes switching control that alternately switches the winding state between the low speed windings and the first high speed windings at a time ratio in accordance with the speed of the AC motor 40D. Note that the first high speed windings correspond to the winding state of the AC motor 40D in the case where the connection terminals B4 to B6 of the AC motor 40D are connected to one another by the second switch 62D to form a neutral point.

In addition, in the case of the second medium speed area in which the rotation speed ω is greater than or equal to the second reference rotation speed $\omega_{B1H}$ and less than the third reference rotation speed $\omega_{B2H}$, the controller 22D outputs the winding switching signal Sa1 at a low level and the winding switching signals Sa2 and Sa3 which alternately become a high level. Accordingly, the controller 22D executes switching control that alternately switches the winding state between the first high speed windings and second the high speed windings at a time ratio in accordance with the speed of the AC motor 40D. Note that the second high speed windings correspond to the winding state of the AC motor 40D in the case where the connection terminals B1 to B3 of the AC motor 40D are connected to one another by the third switch 63D to form a neutral point.

As has been described above, the drive system 100D according to the fifth embodiment can switch the winding state of the AC motor 40D to four states, namely, a state of only the low speed windings, a switching state between the low speed windings and the first high speed windings, a switching state between the first high speed windings and the second high speed windings, and a state of only the high speed windings. Accordingly, a highly efficient area can be further enlarged, compared with the drive systems 100, 100A, and the like according to the above-described embodiments.

As with the case of the drive system 100A of the second embodiment, in the case of transition of the winding state of the AC motor 40B between the low speed windings and the first high speed windings and in the case of transition between the first high speed windings and the second high speed windings, transition of the winding state of the AC motor 40B may be performed while alternately switching the winding state by performing switching control.

Sixth Embodiment

In the drive systems 100 and 100A to 100D according to the above-described embodiments, the electric characteristics of the AC motor are switched by switching the winding state of the AC motor. In a drive system according to the sixth embodiment, the electric characteristics of an AC motor are switched by switching the number of poles of the AC motor. In addition, in the following description, points different from the drive system 100 according to the first embodiment are mainly discussed, and elements with the same or similar functions as those in the first embodiment are given the same reference numerals, descriptions of which are omitted.

Figure 21:
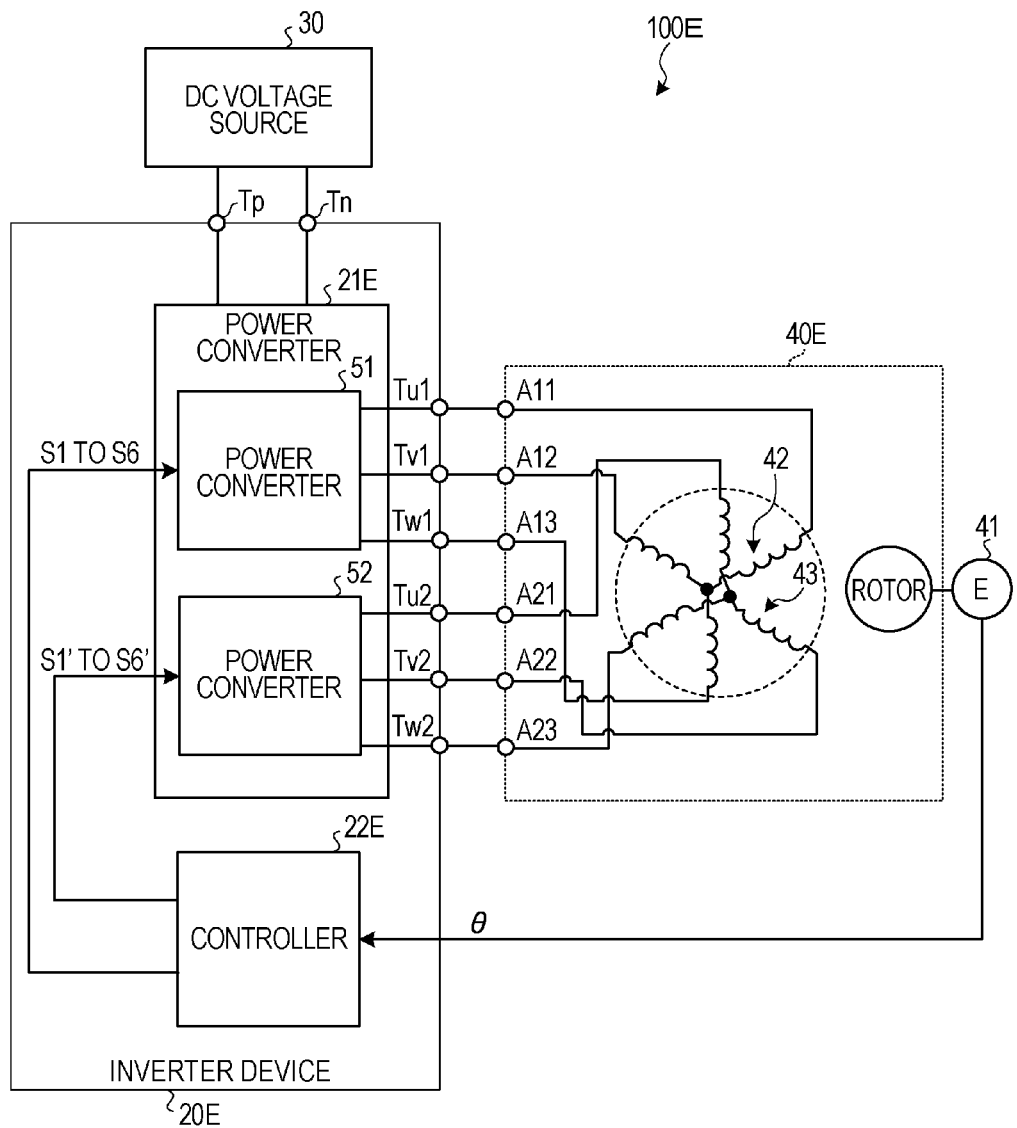
FIG. 21 is a diagram illustrating the configuration of a drive system according to a sixth embodiment.

FIG. 21 is a diagram illustrating the configuration of a drive system 100E according to the sixth embodiment. As illustrated in FIG. 21, the drive system 100E includes an inverter device 20E and an AC motor 40E. The inverter device 20E includes a power converter 21E and a controller 22E. The power converter 21E includes two power converters 51 and 52. The power converters 51 and 52 have the same or similar configuration as the power converter 21 (see FIG. 3) and are controlled by PWM signals S1 to S6 and S1' to S6' output from the controller 22E.

The AC motor 40E is a double-winding AC motor with two sets of three-phase armature windings 42 and 43. The two sets of three-phase armature windings 42 and 43 are sets of windings with different specifications. In the AC motor 40E, the power converter 51 is connected to connection terminals A11 to A13 provided at one ends of one set of three-phase armature windings 42, and the power converter 52 is connected to connection terminals A21 to A23 provided at one ends of the other set of three-phase armature windings 43.

The controller 22E of the inverter device 20E can cause the AC motor 40E to operate as a 2n-pole (such as four-pole) motor by supplying homopolar currents from the two power converters 51 and 52 to the two sets of three-phase armature windings 42 and 43. In addition, the controller 22E can cause the AC motor 40E to operate as an n-pole (such as two-pole) motor by supplying antipolar currents from the two power converters 51 and 52 to the two sets of three-phase armature windings 42 and 43.

As has been described above, the drive system 100E according to the sixth embodiment drives the two sets of three-phase armature windings 42 and 43 with different specifications included in one AC motor 40E by the two power converters 51 and 52, and switches the number of poles of the motor by switching a combination of current vectors. Because the technology of switching the number of poles of a motor is publicly known technology as described in IEEE Transactions on Industry Applications, Vol. 32d No. 4, July/August, 1996, pp. 938-944, for example, a description thereof is omitted here.

In the case of a low speed operation in which the rotation speed ω is less than or equal to the first reference rotation speed $\omega_{BL1}$, the controller 22E supplies homopolar currents from the two power converters 51 and 52 to the two sets of three-phase armature windings 42 and 43. In this case, because the AC motor 40E operates as a 2n-pole (an example of the number of poles for low speed) motor, the electric characteristics of the AC motor 40E become low speed characteristics in which the number of poles is great.

In addition, in the case of a high speed operation in which the rotation speed ω is greater than or equal to the second reference rotation speed $\omega_{BH1}$ ($>\omega_{BL1}$), the controller 22E supplies antipolar currents from the two power converters 51 and 52 to the two sets of three-phase armature windings 42 and 43. In this case, because the AC motor 40E operates as an n-pole (an example of the number of poles for high speed) motor, the electric characteristics of the AC motor 40E become high speed characteristics in which the number of poles is small.

Meanwhile, in the case of a medium speed operation in which the rotation speed ω is greater than the first reference rotation speed $\omega_{BL1}$ and less than the second reference rotation speed $\omega_{BH1}$, the controller 22E switches the winding state between a state in which the controller 22E supplies homopolar currents to the two sets of three-phase armature windings 42 and 43 and a state in which the controller 22E supplies antipolar currents to the two sets of three-phase armature windings 42 and 43 at a time ratio in accordance with the speed of the AC motor 40E.

Accordingly, the drive system 100E according to the sixth embodiment executes switching control that alternately switches the number of poles of the AC motor 40E between 2n-poles and n-poles of the AC motor 40E at a time ratio in accordance with the speed of the AC motor 40E. Therefore, even during acceleration or deceleration, fluctuations of the electric characteristics of the AC motor 40E can be suppressed, and effects caused by switching of the electric characteristics of the AC motor 40E can be suppressed. In addition, a highly efficient area can be enlarged.

As with the case of the second embodiment, in transition from a low speed area to a high speed area or in transition from a high speed area to a low speed area, transition between a low speed operation and a high speed operation may be performed while alternately switching the number of poles between the number of poles for low speed and the number of poles for high speed of the AC motor 40E.

As has been described above, in the drive systems 100 and 100A to 100E according to the above-described embodiments, effects caused by switching of the electric characteristics of the AC motors 40 and 40B to 40E can be suppressed, and a highly efficient area can be enlarged by executing switching control that alternately switches the electric characteristics of the AC motors 40 and 40B to 40E at a time ratio in accordance with the speed of the AC motors 40 and 40B to 40E.

In the drive systems 100 and 100A according to the above-described embodiments, for example, the AC motor 40 may be a double-winding AC motor in which the low speed windings and the high speed windings are separate sets of windings.

Although the inverter device 20 is described as a voltage-source inverter in the above-described embodiments, the inverter device 20 may be a current-source inverter.

Although switching control in which the rotation speed of the AC motors 40 and 40B to 40E is detected and the electric characteristics of the AC motors 40 and 40B to 40E are alternately switched is performed in the above-described embodiments, it is only necessary to accordingly perform switching control in accordance with the rotation speed ω of the AC motors 40 and 40B to 40E. Therefore, the case in which switching control is performed by detecting the output voltage or output current of the inverter device 20 and the case of V/f constant control in which switching control is performed at a command frequency for the AC motor 40 are also included in control in accordance with speed.

It should be understood by those skilled in the art that various modifications, combinations, sub-combinations and alterations may occur depending on design requirements and other factors insofar as they are within the scope of the appended claims or the equivalents thereof.

What is claimed is:

1. An inverter device comprising:
 a power supply unit that supplies alternating-current (AC) power to an AC motor whose electric characteristics in response to a rotation speed are switchable between low speed characteristics and high speed characteristics; and
 a switch controller that switches the electric characteristics of the AC motor,
 wherein the switch controller executes switching control that alternately switches the electric characteristics of the AC motor between the low speed characteristics and the high speed characteristics on the basis of the rotation speed of the AC motor in a case where the rotation speed of the AC motor is greater than a first reference rotation speed and less than a second reference rotation speed which is greater than the first reference rotation speed,
 wherein the electric characteristics of the AC motor are switchable by switching a winding state between a low speed winding and a high speed winding, and
 wherein the switch controller executes the switching control by alternately switching the winding state of the AC motor between the low speed winding and the high speed winding.

2. The inverter device according to claim 1, wherein the switch controller executes the switching control at a time ratio in accordance with the rotation speed of the AC motor.

3. The inverter device according to claim 1, wherein, in the case of transition of the electric characteristics of the AC motor from one characteristic state of the low speed characteristics and the high speed characteristics to the other characteristic state, the switch controller executes switching control that alternately switches the electric characteristics of the AC motor between the one characteristic state and the other characteristic state while shortening a time of the one characteristic state.

4. The inverter device according to claim 1,
 wherein the electric characteristics of the AC motor are switchable by switching the number of poles, and
 wherein the switch controller executes switching control that alternately switches the number of poles of the AC motor between the number of poles for low speed and the number of poles for high speed on the basis of the rotation speed of the AC motor.

5. The inverter device according to claim 1,
 wherein the power supply unit includes
  a power converter including a switching element, and
  a phase-width modulation (PWM) signal generator that outputs a PWM signal on the basis of a comparison between a voltage command and a carrier wave and controls the switching element, and
 wherein the switch controller executes the switching control in synchronization with the carrier wave.

6. The inverter device according to claim 5, further comprising a command generator that generates the voltage command from a torque command on the basis of setting data including a motor constant and a control parameter,
 wherein the switch controller obtains the setting data in accordance with the switching control by using a table or an arithmetic operation, and outputs the setting data to the command generator.

7. The inverter device according to claim 1,
 wherein the power supply unit includes
  a power converter including a switching element, and
  a phase-width modulation (PWM) signal generator that outputs a PWM signal on the basis of a comparison between a voltage command and a carrier wave and controls the switching element, and
 wherein the switch controller executes the switching control out of synchronization with the carrier wave.

8. The inverter device according to claim 1, wherein the switch controller executes the switching control at a frequency higher than an output frequency of the power supply unit.

9. The inverter device according to claim 1, further comprising:
 a constant switch connected to the switch controller so as to select and output a setting data in response to a winding switching signal from the switch controller to switch the winding state of the AC motor,
 wherein the constant switch selects and outputs the setting data among a low speed setting data for the low speed characteristics, a high speed setting data for the high speed characteristics, and a medium speed setting data for the switching control in response to the winding switching signal, and
 wherein the AC power is made based on the setting data.

10. A motor drive system comprising:
 an alternating-current (AC) motor whose electric characteristics in response to a rotation speed are switchable between low speed characteristics and high speed characteristics;
 a power supply unit that supplies AC power to the AC motor; and
 a switch controller that switches the electric characteristics of the AC motor,
 wherein the switch controller executes switching control that alternately switches the electric characteristics of the AC motor between the low speed characteristics and the high speed characteristics on the basis of the rotation speed of the AC motor in a case where the rotation speed of the AC motor is greater than a first reference rotation speed and less than a second reference rotation speed which is greater than the first reference rotation speed, wherein the electric characteristics of the AC motor are switchable by switching a winding state between a low speed winding and a high speed winding, and wherein the switch controller executes the switching control by alternately switching the winding state of the AC motor between the low speed winding and the high speed winding.

11. The motor drive system according to claim 10, wherein the switch controller executes the switching control at a frequency higher than an output frequency of the power supply unit.

12. The motor drive system according to claim 10, further comprising:

a constant switch connected to the switch controller so as to select and output a setting data in response to a winding switching signal from the switch controller to switch the winding state of the AC motor, wherein the constant switch selects and outputs the setting data among a low speed setting data for the low speed characteristics, a high speed setting data for the high speed characteristics, and a medium speed setting data for the switching control in response to the winding switching signal, and wherein the AC power is made based on the setting data.

13. An inverter device comprising:

power supply means for supplying alternating-current (AC) power to an AC motor whose electric characteristics in response to a rotation speed are switchable between low speed characteristics and high speed characteristics; and switch control means for switching the electric characteristics of the AC motor, wherein the switch control means executes switching control that alternately switches the electric characteristics of the AC motor between the low speed characteristics and the high speed characteristics on the basis of the rotation speed of the AC motor in a case where the rotation speed of the AC motor is greater than a first reference rotation speed and less than a second reference rotation speed which is greater than the first reference rotation speed, wherein the electric characteristics of the AC motor are switchable by switching a winding state between a low speed winding and a high speed winding, and wherein the switch control means executes the switching control by alternately switching the winding state of the AC motor between the low speed winding and the high speed winding.

14. The inverter device according to claim 13, wherein the switch control means executes the switching control at a time ratio in accordance with the rotation speed of the AC motor.

15. The inverter device according to claim 13, wherein, in the case of transition of the electric characteristics of the AC motor from one characteristic state of the low speed characteristics and the high speed characteristics to the other characteristic state, the switch control means executes switching control that alternately switches the electric characteristics of the AC motor between the one characteristic state and the other characteristic state while shortening a time of the one characteristic state.

16. The inverter device according to claim 13, wherein the electric characteristics of the AC motor are switchable by switching the number of poles, and wherein the switch control means executes switching control that alternately switches the number of poles of the AC motor between the number of poles for low speed and the number of poles for high speed on the basis of the rotation speed of the AC motor.

17. The inverter device according to claim 13, wherein the power supply means includes power converting means including a switching element, and phase-width modulation (PWM) signal generating means for outputting a PWM signal on the basis of a comparison between a voltage command and a carrier wave and controlling the switching element, and wherein the switch control means executes the switching control in synchronization with the carrier wave.

18. The inverter device according to claim 17, further comprising command generating means for generating the voltage command from a torque command on the basis of setting data including a motor constant and a control parameter, wherein the switch control means obtains the setting data in accordance with the switching control by using a table or an arithmetic operation, and outputs the setting data to the command generating means.

19. The inverter device according to claim 13, wherein the power supply means includes power converting means including a switching element, and phase-width modulation (PWM) signal generating means for outputting a PWM signal on the basis of a comparison between a voltage command and a carrier wave and controlling the switching element, and wherein the switch control means executes the switching control out of synchronization with the carrier wave.

20. The inverter device according to claim 13, wherein the switch control means executes the switching control at a frequency higher than an output frequency of the power supply means.

21. The inverter device according to claim 13, further comprising:

constant switch means connected to the switch control means so as to select and output a setting data in response to a winding switching signal from the switch control means to switch the winding state of the AC motor, wherein the constant switch means selects and outputs the setting data among a low speed setting data for the low speed characteristics, a high speed setting data for the high speed characteristics, and a medium speed setting data for the switching control in response to the winding switching signal, and wherein the AC power is made based on the setting data.

* * * * *